(12) United States Patent
Bianchi et al.

(10) Patent No.: US 7,505,662 B2
(45) Date of Patent: Mar. 17, 2009

(54) DEVICES AND METHODS FOR MEASURING FORCES EXERTED BY FERRULES OF OPTICAL CONNECTORS

(75) Inventors: Robert J. Bianchi, Minneapolis, MN (US); Ryan L. Lindquist, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/564,495

(22) Filed: Nov. 29, 2006

(65) Prior Publication Data

US 2008/0121047 A1 May 29, 2008

(51) Int. Cl.
  *G02B 6/00* (2006.01)
  *G01L 1/00* (2006.01)
  *G01L 5/00* (2006.01)
(52) U.S. Cl. .................... 385/134; 385/147; 73/862.51; 73/862.381
(58) Field of Classification Search ................. 385/134, 385/147; 73/862.51, 862.52, 862.53, 862.381, 73/862.451
See application file for complete search history.

(56) References Cited

U.S. PATENT DOCUMENTS 6,116,101 A 9/2000 Rader

OTHER PUBLICATIONS

Advantech Co., Ltd., Part No. 2001600000, First Edition, "Adam-6000 Ethernet-based Data Acquisition and Control Modules," © Mar. 2002, pp. 1-156.
IMADA, Instruction Manual, "Model DPS and Model DPSH," Oct. 2005, 8 pages.
McMaster-Carr Supply Company, Part No. 6331K35, "Miniature 175 in.-oz. DC Gearmotor," © 2003, 1 page.
Mitutoyo Corporation, "Absolute ID-U1025 Digimatic Indicator/Comp," (admitted prior art as of the filing date), 2 pages.
Mitutoyo Corporation, User's Manual, Part No. 99MAM016B, Series No. 264, "Input Tool Nos. IT-005D and IT-007R," (admitted prior art as of the filing date), 12 pages.
Parker Hannifin Corporation, Catalog 8092/USA, Manual Positioners, Linear Positioning Stages, "4000 Series (1.75 inches wide) Square Face, Multi-Axis Stages," (admitted prior art as of the filing date), 2 pages.
Pittman Express™, GM9413-4, "Lo-Cog® DC Gearmotor," © 2001, 1 page.
Wagner Instruments, Wagner Operation Manual, "Force One™ FDI/FDIX Plug 'N Play Force Gage Interchangeable Force Cell Modules 2 TO 200 LBF," (admitted prior art as of the filing date), 13 pages.

*Primary Examiner*—Kevin S Wood
(74) *Attorney, Agent, or Firm*—Merchant & Gould P.C.

(57) ABSTRACT

A device for measuring a force exerted by a ferrule of a fiber optic connector includes a base including an adapter mount configured to accept one of a plurality of adapter assemblies, and a stage coupled to the base, the stage moving longitudinally with respect to the base. The device also includes a force gauge coupled to the stage, and an adapter assembly configured to be coupled to the adapter mount of the base, the adapter assembly defining an adapter configured to receive the fiber optic connector. The fiber optic connector is connected to the adapter assembly, and the force gauge measures the force exerted by the ferrule of the fiber optic connector. Systems and methods for measuring the force exerted by the ferrule of a fiber optic connector are also included.

14 Claims, 23 Drawing Sheets

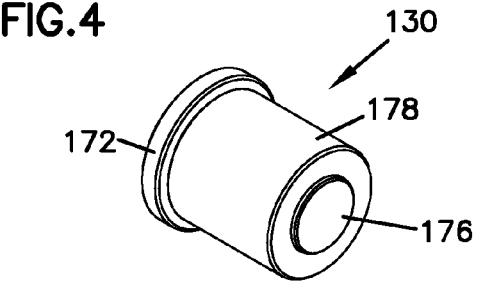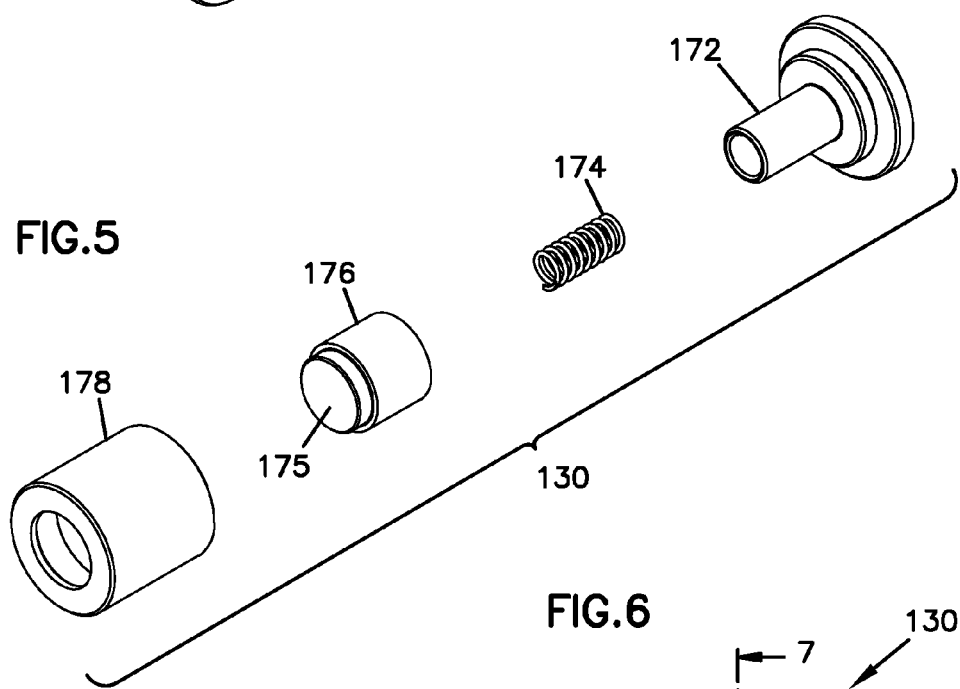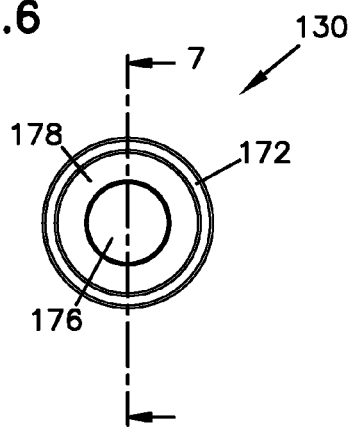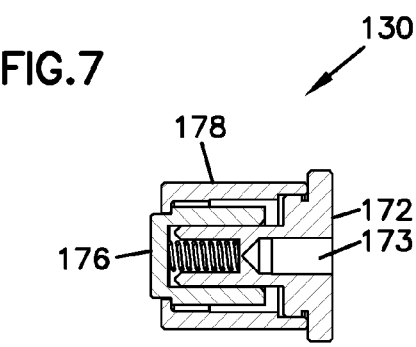

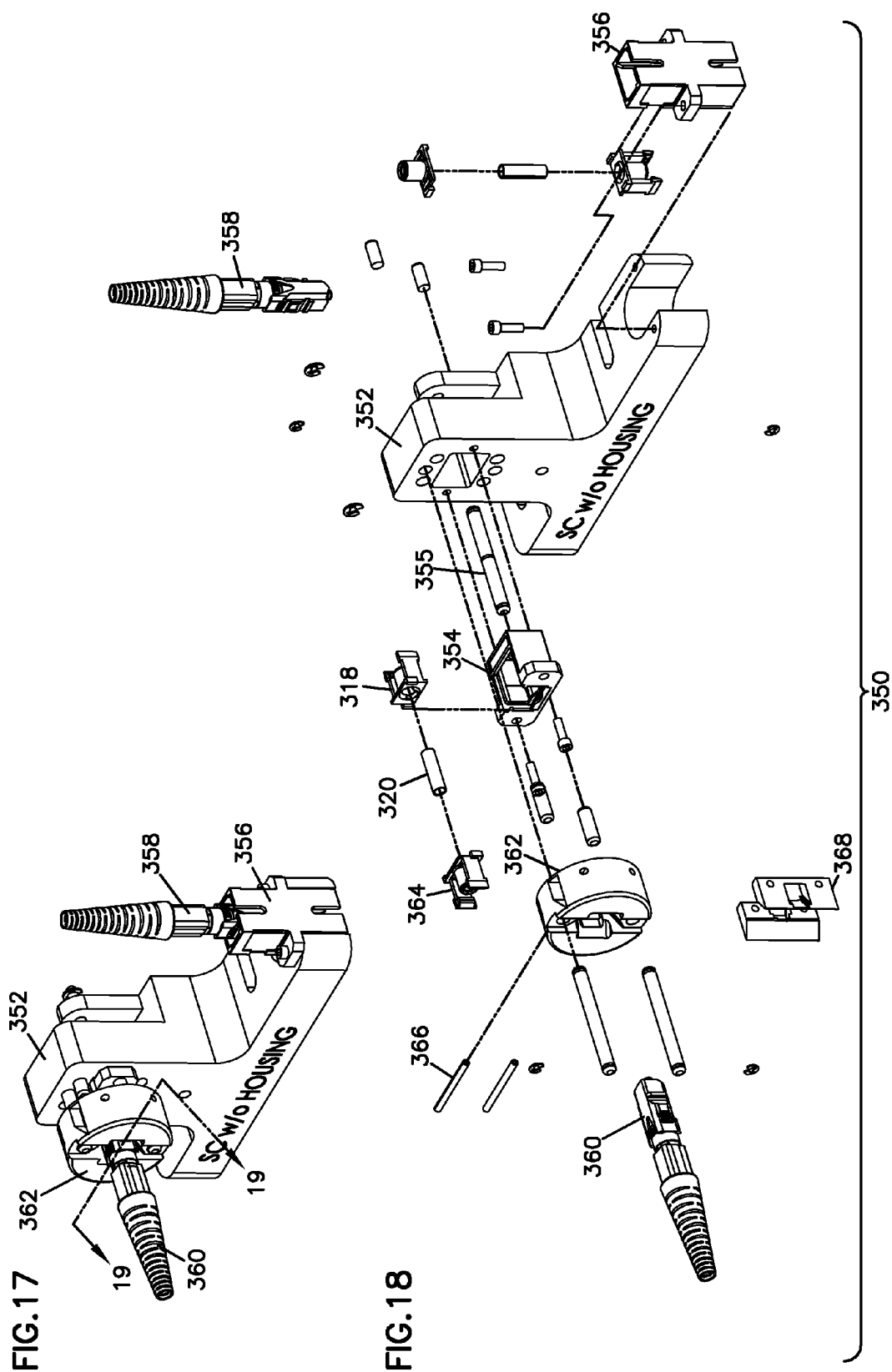

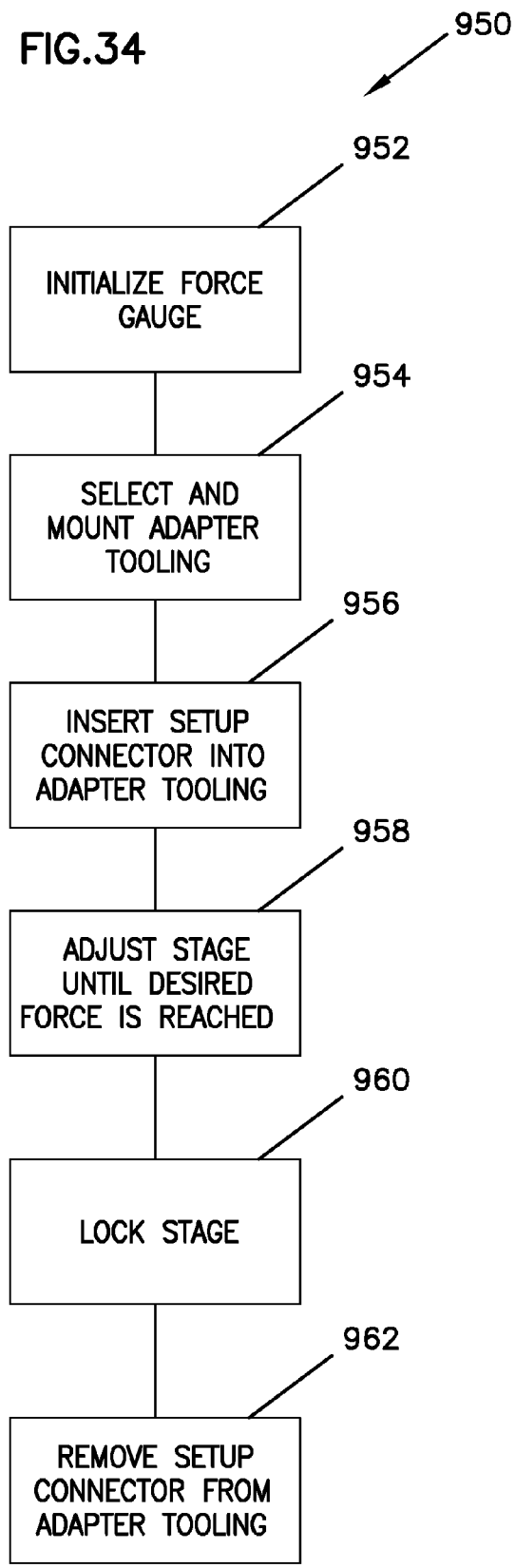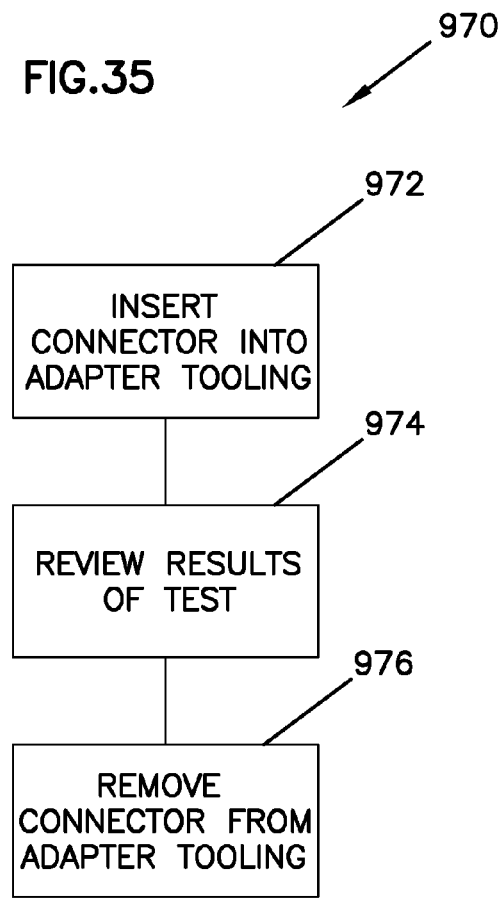

DEVICES AND METHODS FOR MEASURING FORCES EXERTED BY FERRULES OF OPTICAL CONNECTORS

BACKGROUND

Fiber optic cables are terminated using one or more fiber optic connectors. A typical fiber connector includes a hub connected to a ferrule that surrounds an optical fiber through which the optical signal propagates. A connector housing surrounds the hub and ferrule. The hub and ferrule are typically forced into a forward position by a spring positioned within the housing. Examples of such connectors include FC, SC, LC, and LX.5 connectors.

When the connector is coupled to a mating connector using, for example, an adapter or sleeve, the ferrule of one connector contacts the ferrule of the opposing connector. Each ferrule exerts a force on the opposite ferrule, causing each ferrule to be depressed against the spring into the respective housing of each connector. In this manner, a proper connection between the ferrules of the mating connectors is accomplished so that the optical fibers of each connector are aligned to allow for transmission therethrough.

In certain situations, a connector can malfunction, resulting in a less than optimum optical performance. For example, in certain circumstances, the movement of the hub and ferrule within the housing of the connector can be hindered. In such situations, a greater force can be required for the ferrule and hub to be depressed when mating to another connector, or depression of the ferrule can be forestalled altogether. In other circumstances, the ferrule and hub can become stuck in the depressed state within the housing instead of returning to the forward position upon disconnection of the connector.

Performance of the connector can be adversely affected in such circumstances. For example, if excessive force is required to depress a ferrule of a fiber optic connector, the ferrule can damage the end face of a ferrule of mating connector. Likewise, if a ferrule becomes stuck in a depressed state, the ferrule may not make optimum contact with the ferrule of a mating connector, thereby decreasing optical performance through the connector.

Improvements in devices and methods for identifying connectors exhibiting such undesired characteristics are needed.

SUMMARY

In an aspect, a device for measuring a force exerted by a ferrule of a fiber optic connector includes a base including an adapter mount configured to accept one of a plurality of adapter assemblies, and a stage coupled to the base, the stage moving longitudinally with respect to the base. The device also includes a force gauge coupled to the stage, and an adapter assembly configured to be coupled to the adapter mount of the base, the adapter assembly defining an adapter configured to receive the fiber optic connector. The fiber optic connector is connected to the adapter assembly, and the force gauge measures the force exerted by the ferrule of the fiber optic connector.

In another aspect, a system for measuring a force exerted by a ferrule of a fiber optic connector includes a device for measuring the force exerted by the ferrule, the device including a base including an adapter assembly for receiving the fiber optic connector, a stage coupled to the base, the stage moving longitudinally with respect to the base, and a force gauge coupled to the stage. The system also includes a motor positioned to move the stage longitudinally with respect to the base, and a computer system connected to the force gauge of the device and to the motor. The computer system is programmed to control the motor to move the force gauge longitudinally with respect to the base, the force gauge measures the force exerted by the ferrule of the fiber optic connector as the force gauge is moved longitudinally by the motor, and the computer system is programmed to receive and store a plurality of forces measured by the force gauge as the force gauge is moved longitudinally by the motor to compress the ferrule of the fiber optic connector.

In yet another aspect, a method for measuring a force exerted by a ferrule of a fiber optic connector includes: selecting an adapter assembly among a plurality of adapter assemblies configured to accept a plurality of different connector types; coupling the adapter assembly to a device including a force gauge; and measuring the force exerted by the ferrule of the fiber optic connector using the force gauge.

DESCRIPTION OF THE DRAWINGS

Reference will now be made to the accompanying drawings, which are not necessarily drawn to scale.

FIG. 4 is a perspective view of an example end cap assembly of the force gauge device of FIG. 1.

FIG. 5 is an exploded perspective view of the end cap assembly of FIG. 4.

FIG. 6 is an end view of the end cap assembly of FIG. 4.

FIG. 7 is a cross sectional view taken along line 7-7 of the end cap assembly of FIG. 6.

FIG. 17 is a perspective view of another example adapter assembly.

FIG. 18 is an exploded perspective view of the adapter assembly of FIG. 17.

FIG. 34 is an example flowchart for calibrating the force gauge device of FIG. 28.

FIG. 35 is an example flowchart for testing a fiber connector using the force gauge device of FIG. 28.

DETAILED DESCRIPTION

Example embodiments will now be described more fully hereinafter with reference to the accompanying drawings. These embodiments are provided so that this disclosure will be thorough and complete. Like numbers refer to like elements throughout.

Generally, examples described herein relate to systems, devices, and methods used to measure the force exerted by a ferrule of a fiber connector during depression (e.g., during compression and/or expansion of the ferrule). Such measurements can be used, for example, to identify connectors that have ferrules that exhibit depressive forces that are operating at non-optimal levels. This can result in decreased optical performance for the connector.

Figure 1:
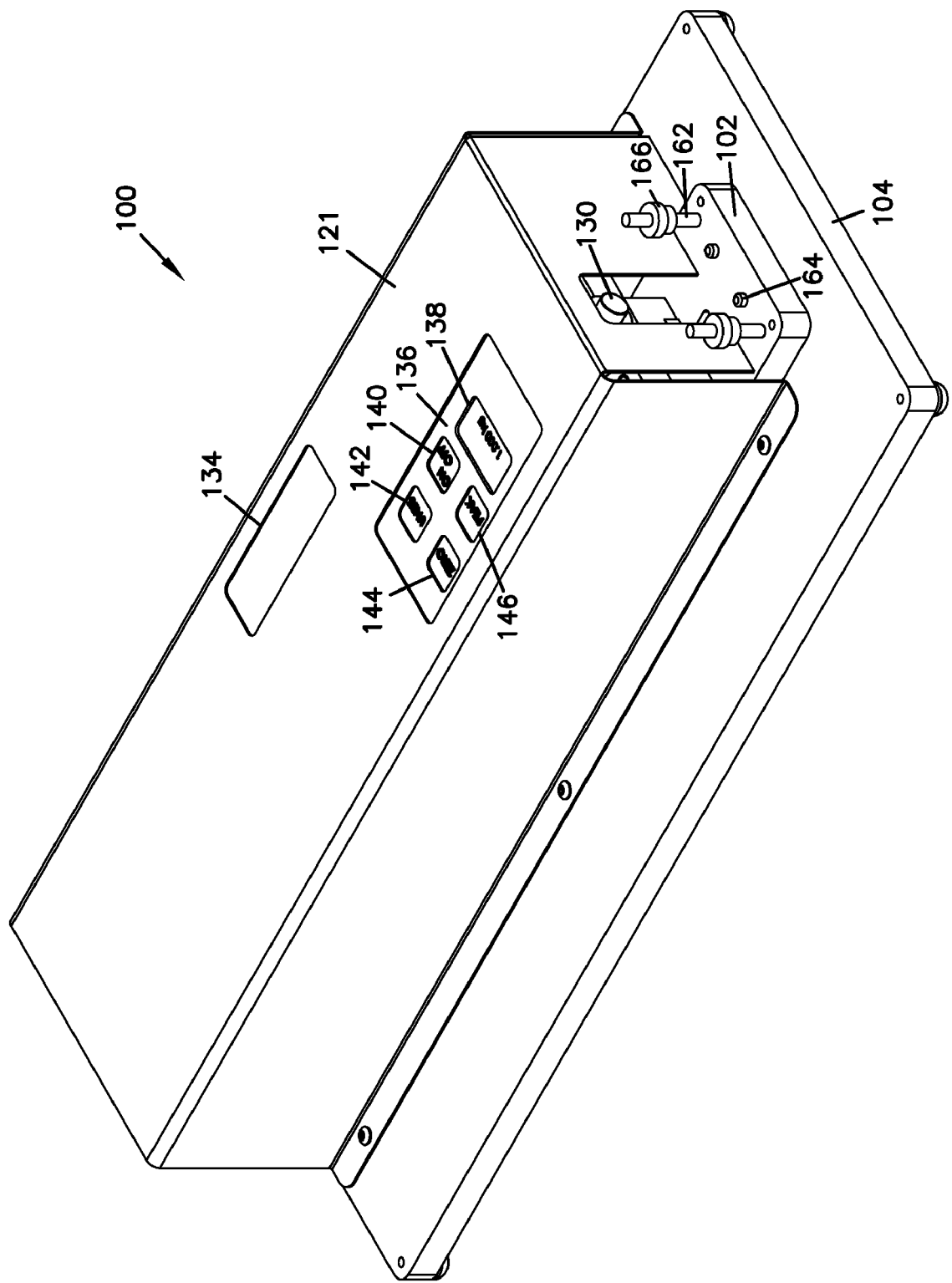
FIG. 1 is a perspective view of an example force gauge device.
Figure 2:
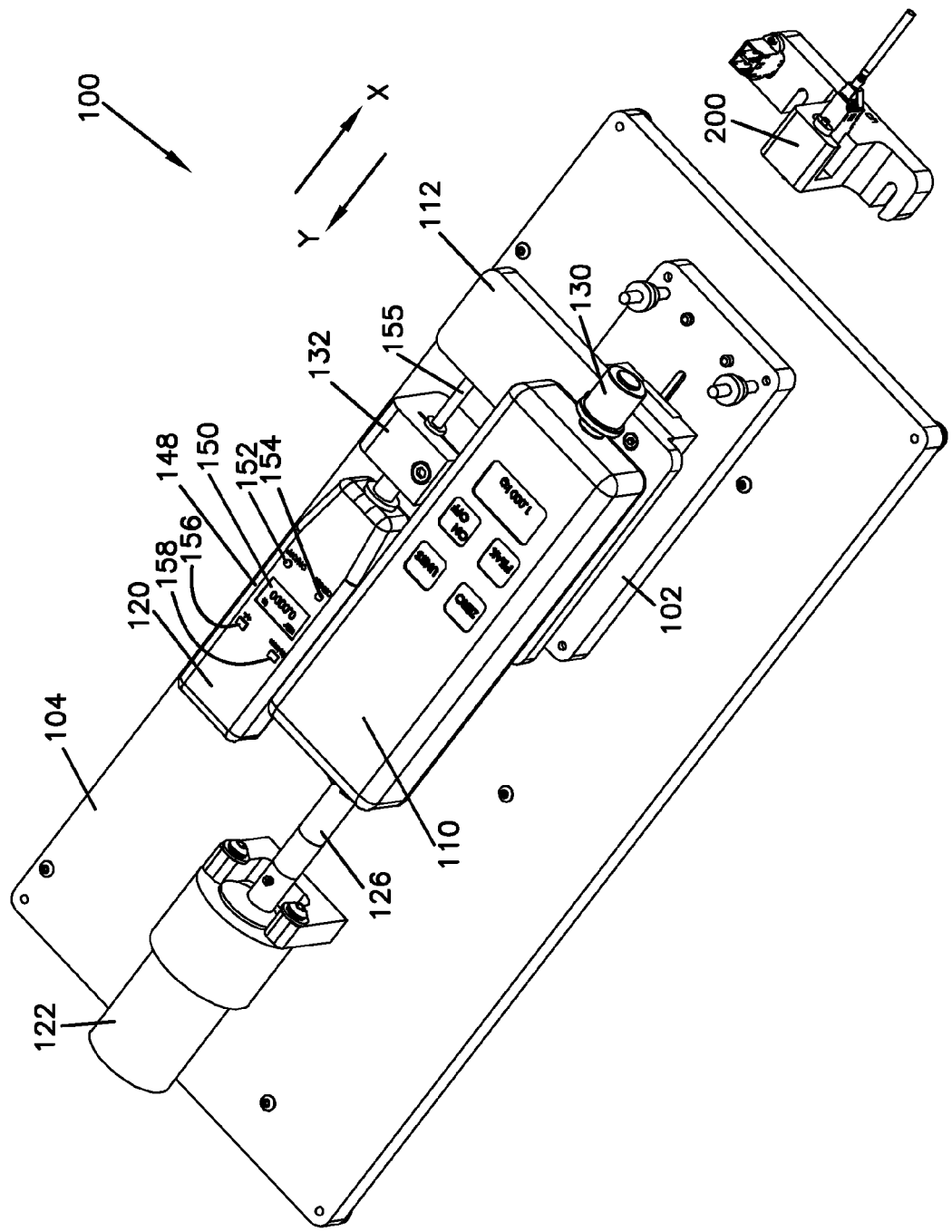
FIG. 2 is another perspective view of the force gauge device of FIG. 1 with the housing removed and an example adapter assembly exploded therefrom.
Figure 3:
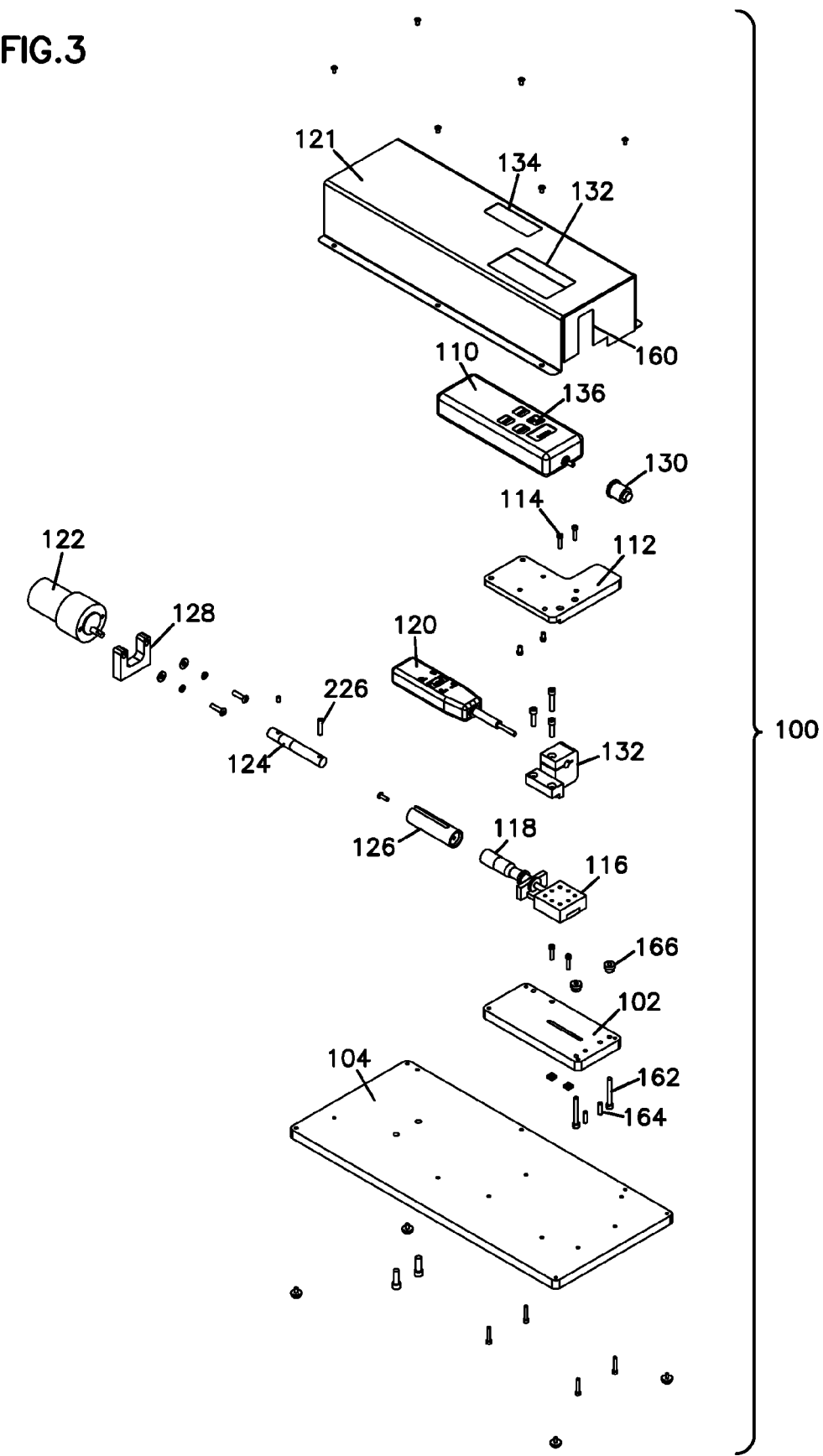
FIG. 3 is an exploded perspective view of the force gauge device of FIG. 1.

Referring now to FIGS. 1-3, an example force gauge device 100 is shown. Device 100 includes a force gauge 110 configured to measure a force applied to an end-cap assembly 130 connected to force gauge 110.

End cap assembly 130 includes a base 172, a compression spring 174, a pin 176, and a ring 178. See FIGS. 5-7. Pin 176 is positioned within ring 178, and pin 176 is forced by spring 174 so that a front surface 175 of pin 176 extends from ring 178. An aperture 173 formed in base 172 is connected to force gauge 110. Surface 175 is positioned to engage a pin of an adapter assembly (see adapter assemblies 300, 350, 370, 390 described below). Spring 174 allows pin 176 to move longitudinally a short distance within ring 178 towards base 172 when a force is applied to surface 175 to absorb and minimize transfer to force gauge 110 of any impact that is applied to surface 175.

Referring again to FIG. 1-3, force gauge 110 includes a control panel 136 with a display 138 that displays the current force that is being applied to end-cap assembly 130. Control panel 136 also includes an on-off button 140 that turns force gauge 110 on and off, a units button 142 that changes the units displayed on display 138 from English to metric (e.g., lbs. to kgs.), a zero button 144 that zeros the force shown on display 138, and a peak button 146 that causes the peak force that has been measured to be displayed on display 138. In example embodiments, force gauge 110 includes one or more input/output ports (e.g., serial or USB) that can be connected to a computer system to control and receive data from force gauge 110, as described further below.

Figure 16:
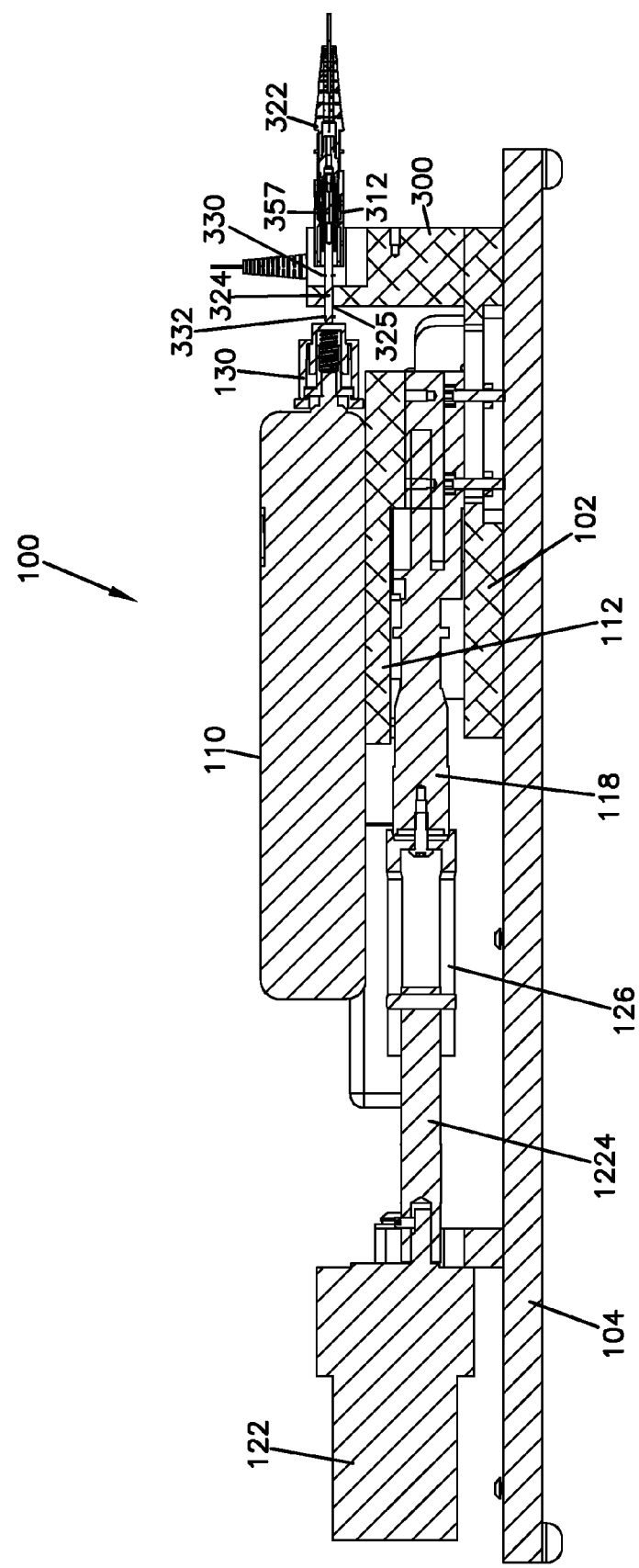
FIG. 16 is a cross sectional view taken along line 16-16 of the force gauge device of FIG. 11.

In examples, force gauge 110 is model number DPS-4R that is manufactured by Imada of Northbrook, Ill. Other types of force gauges can also be used, as noted below. In examples, force gauge 110 can be programmed to take and store force measurements at multiple times as end-cap assembly 130 is depressed by the ferrule of a connector under test (see, e.g., FIG. 16), or can be programmed to simply measure the current force applied to end-cap assembly 130.

Force gauge 110 is mounted to a mount plate 112 using screws 114. Mount plate 112 is, in turn, coupled to stage 116. In the example, stage 116 is a ball slide stage that travels longitudinally in opposing directions X, Y by turning an adjustment knob 118, as described below. In one example, stage 116 is a ball slide stage with a micrometer head and posi lock having one inch of travel with model number Parker 4004 with Posilock that is manufactured by Parker Hannifin Corporation of Rohnert Park, Calif. Other configurations are possible.

Figure 8:
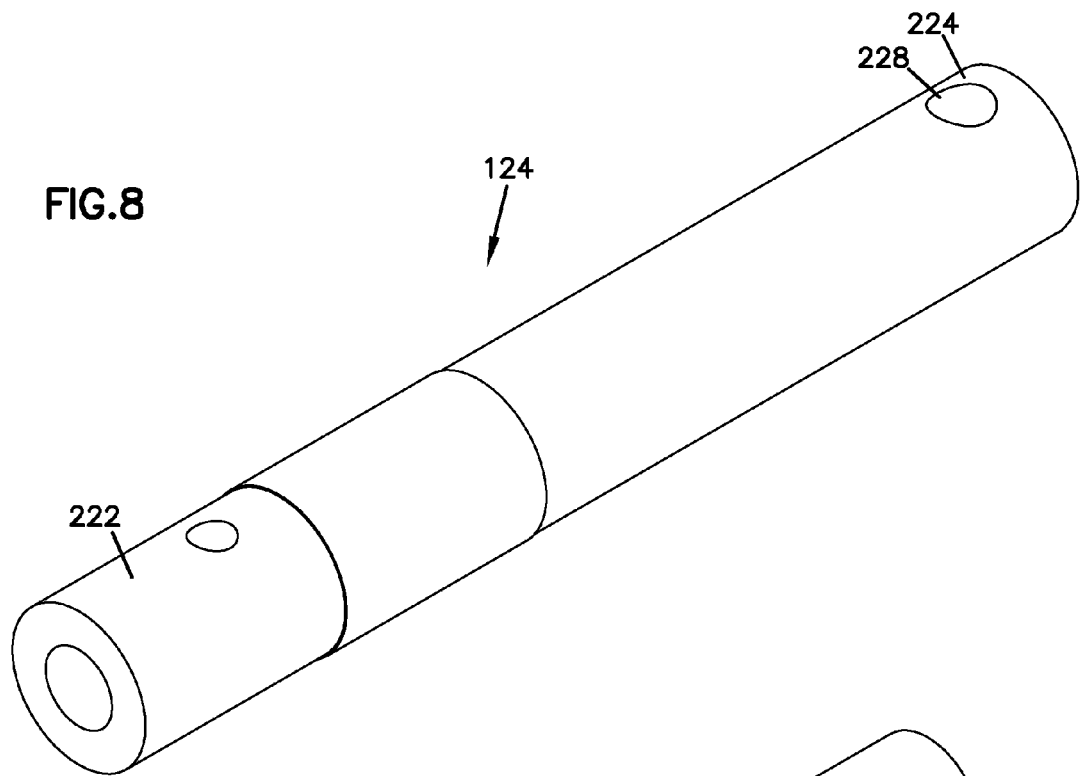
FIG. 8 is a perspective view of an example drive shaft of the force gauge device of FIG. 1.
Figure 9:
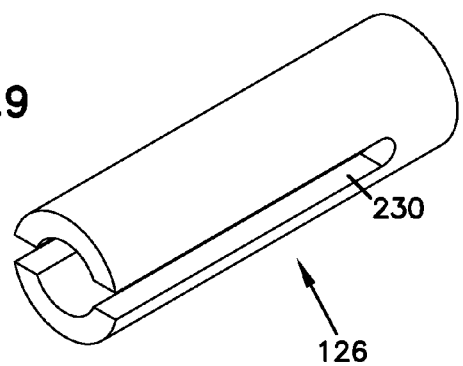
FIG. 9 is a perspective view of an example mic coupler of the force gauge device of FIG. 1.
Figure 10:
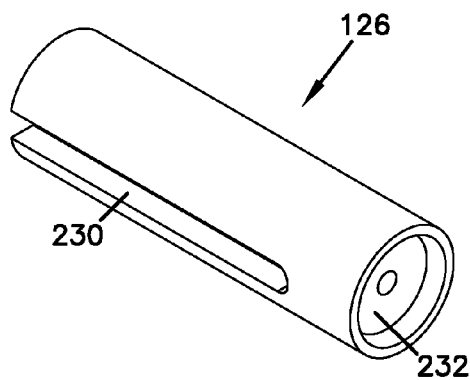
FIG. 10 is another perspective view of the mic coupler of FIG. 9.
Figure 11:
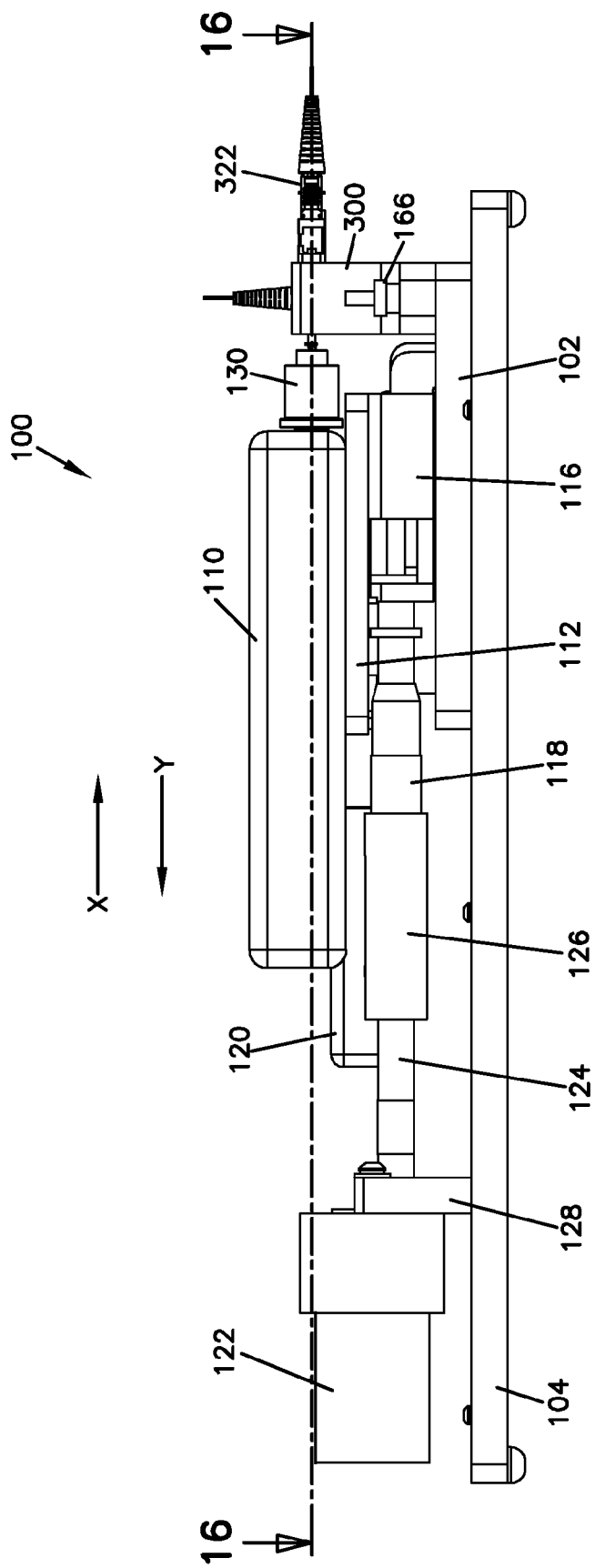
FIG. 11 is a side view of the force gauge device of FIG. 2 including an example adapter assembly.
Figures 12, 13:
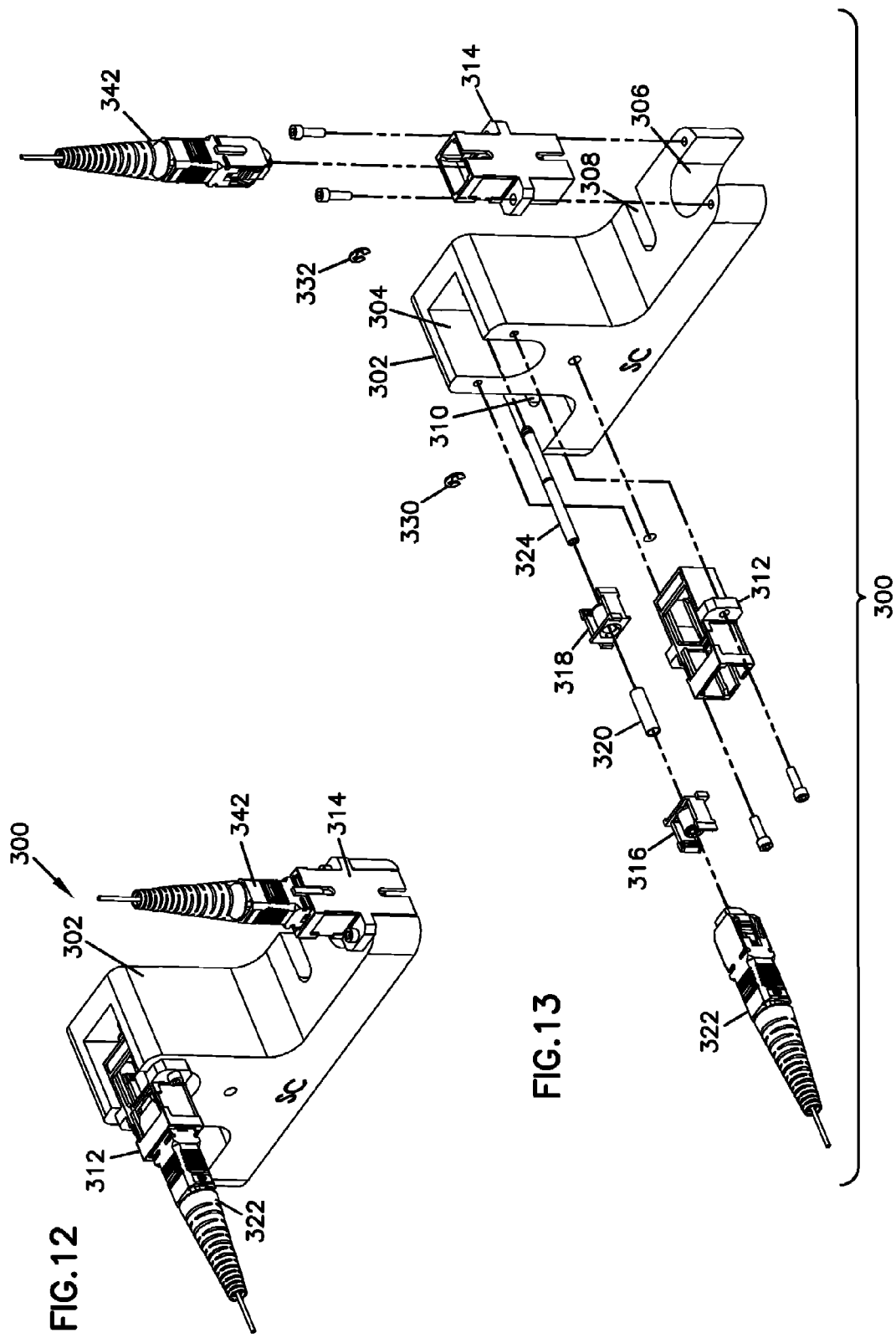
FIG. 12 is a perspective view of the adapter assembly of FIG. 11.
FIG. 13 is an exploded perspective view of the adapter assembly of FIG. 12.
Figure 14:
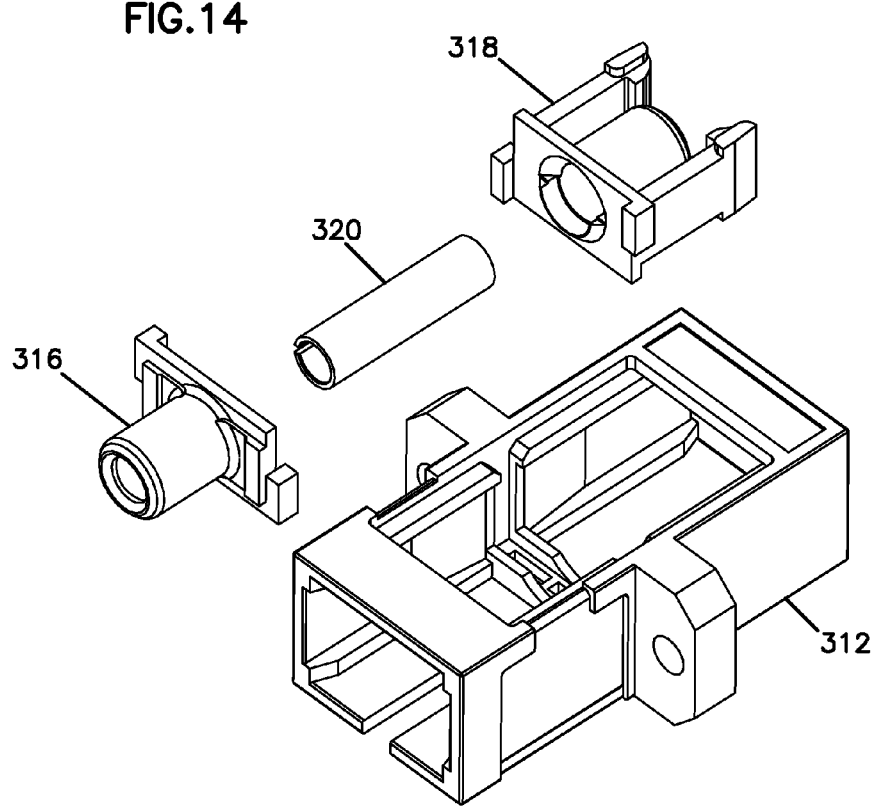
FIG. 14 is an exploded perspective view of an example adapter of the adapter assembly of FIG. 12.
Figure 15:
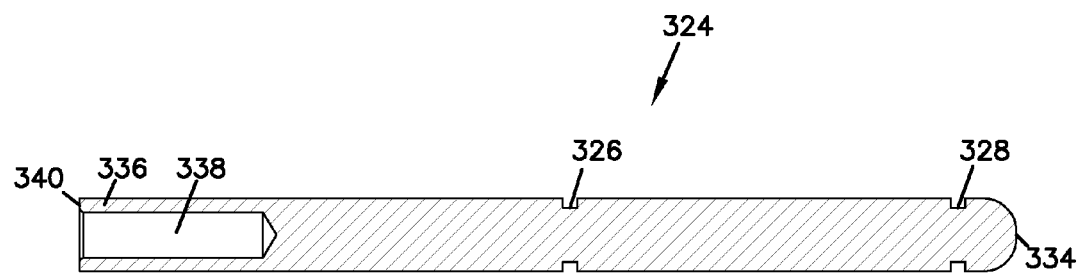
FIG. 15 is a cross sectional view of an example pin of the adapter assembly of FIG. 12.

A motor 122 is coupled to adjustment knob 118 through a drive shaft 124 and a mic coupler 126. See FIGS. 8-10. A first end 222 of drive shaft 124 is connector to and is driven by motor 122 as motor 122 rotates. A second end 224 of drive shaft 124 is received within and coupled to mic coupler 126 by using a pin 226 (see FIG. 3) positioned within an aperture 228 formed in drive shaft 124. Pin 226 extends through a slot 230 formed in mic coupler 126 so that mic coupler 126 rotates as drive shaft 124 is rotated by motor 122. An end 232 of mic coupler 126 is, in turn, coupled to adjustment knob 118 so that adjustment knob 118 is rotated as mic coupler 126 rotates. In this manner, motor 122 can be used to move stage 116 in directions X, Y. In examples, motor 122 also includes one or more input/output ports (e.g., serial or USB) that can be connected to a computer system to control and receive data from motor 122.

In examples, motor 122 is a 24 VDC 7.4 RPM 175 in-oz motor with model number GM9413-4 manufactured by Pittman of Harleysville, Pa. Other motors and configurations can be used.

Referring again to FIGS. 1-3, motor 122 is mounted to a motor plate 128. Motor plate 128 is, in turn, coupled to a gauge base plate 104. In addition, stage 116 is mounted to a base plate 102 which is, in turn, coupled to gauge base plate 104. Screws 162 and dowel pins 164 extend through apertures formed in base plate 102. Thumb nuts 166 are connected to screws 162. As described further below, screws 162 and dowel pins 164 are used to locate and couple adapter assemblies to base plate 102. See, for example, adapter assemblies 300, 350, 370, 390 shown in FIGS. 12-21.

A dial mount block 132 is also coupled to gauge base plate 104. A digital indicator 120 is connected to dial mount block 132. In examples, digital indicator 120 is programmed to measure the position of force gauge 110 relative to a connector that is connected to device 100. For example, digital indicator 120 includes a stem 155 connected to mount plate 112. As force gauge 110 that is connected to mount plate 112 moves longitudinally in directions X, Y, digital indicator 120 measures the relative position of mount plate 112 (and force gauge 110) to base 104 (and the connector under test that is mounted to an adapter assembly connected thereto). In this manner, force measurements taken by force gauge 110 can be correlated to position measurements taken by digital indicator 120 to provide an indication of force at various positions as a ferrule of the connector under test is depressed.

Digital indicator 120 includes a control panel 148 that has a display 150 that displays the amount of travel from the home or origin position, an on-off button 152 that turns digital indicator 120 on and off, an origin button 154 that sets the home or origin for counting purposes, a counting direction key 156 that allows for a change in the direction of counting, a units button 158 that allows for switching between units (e.g., inches or millimeters). Digital indicator 120 can also include one or more input/output ports (e.g., serial or USB) that can be connected to a computer system to control and receive data from digital indicator 120.

In the example shown, digital indicator 120 is model number 575-123 manufactured by Mitutoyo of Japan. Other types of indicators and configurations can be used. For example, in an alternative arrangement, another measurement device, such as an encoder, is used to measure the position of force gauge 110 relative to a connector.

A gauge cover 121 is placed over the various components of device 100 and is coupled to base plate 104. In examples shown, gauge cover 121 includes a first aperture 131 through which control panel 136 of force gauge 110 is accessible. In addition, gauge cover 121 includes a second aperture 134 through which control panel 148 of digital indicator 120 is accessible. A third aperture 160 formed in gauge cover 121 allows access to end-cap assembly 130 of force gauge 110. In example embodiments, gauge cover 121 is made of sheet metal that is punched to form apertures 131, 134, 160, and is bent to form the open box-like shape of gauge cover 121. Other materials, such as a plastic, can also be used to form gauge cover 121.

Referring now to FIGS. 11-16, an adapter assembly 300 is coupled to base plate 102 using screws 162 and dowel pins 164. Generally, adapter assembly 300 is used to hold a setup connector to calibrate device 100, or to hold a connector under test.

In examples, a plurality of adapter assemblies (see, for example, adapter assemblies 300, 350, 370, 390) are provided, with each adapter assembly configured to accept a different type of connector, such as SC (with or without a housing), FC, LC, and LX.5. Adapter assemblies 300, 350, 370, 390 can be readily coupled to and removed from device 100 by loosening and tightening nuts 166 by hand or using a tool, as described below. In this manner, device 100 can be used to test a variety of connector types.

Adapter assembly 300 includes a support 302 with a first seat 304 sized to receive an SC adapter 312. Support 302 also includes a second seat 306 sized to receive another SC adapter 314. Support 302 defines slots 308, 310 positioned to receive screws 162 to allow support 302 to be connected to base plate 102 of device 100.

SC adapter 312 includes adapters 316, 318 and an alignment sleeve 320 positioned therein. SC adapter 312 is configured to accept an SC connector, such as SC connector 322. When SC connector 322 is connected to SC adapter 312, a ferrule 357 of SC connector 322 extends through adapter 316 within sleeve 320. A setup SC connector 342 is connected to SC adapter 314 when not in use. As described further below, setup SC connector 342 is a connector including a ferrule that exerts a known force that can be used to calibrate device 100 before use.

A pin 324 extends through an aperture 325 in support 302, and includes slots 326, 328 therein to receive rings 330, 332 to fix pin 324 relative to support 302. See FIG. 16. In this manner, pin 324 can slide longitudinally through aperture 325 in support 302 as pin 324 contacts and is forced by the ferrule of the connector under test, but cannot be fully slid through in either direction without removing one of rings 330, 332.

A first end 334 of pin 324 is positioned to engage front surface 175 of pin 176 of end cap assembly 130. An opposite second end 336 of pin 324 includes an open interior 338 forming an outer ring end surface 340. In position, second end 336 extends within sleeve 320 of SC adapter 312 to engage ferrule 357 of SC connector 322. Since outer ring end surface 340 actually engages ferrule 357, only the periphery of ferrule 357 is contacted, and the central portion of ferrule 357 including the optical fiber is not contacted by surface 340 of pin 324 so that the optical fiber is not damaged.

In use, as SC connector 322 is connected to adapter 312, ferrule 357 of SC connector 322 contacts surface 340 and depresses pin 324 longitudinally towards force gauge 110. As pin 324 is used to depress ferrule 357 of connector 322, end 334 pushes against surface 175 of pin 176 of end cap assembly 130. Force gauge 110 thereby measures the force exerted by ferrule 357 of SC connector 322 as ferrule 357 is depressed.

Figure 19:
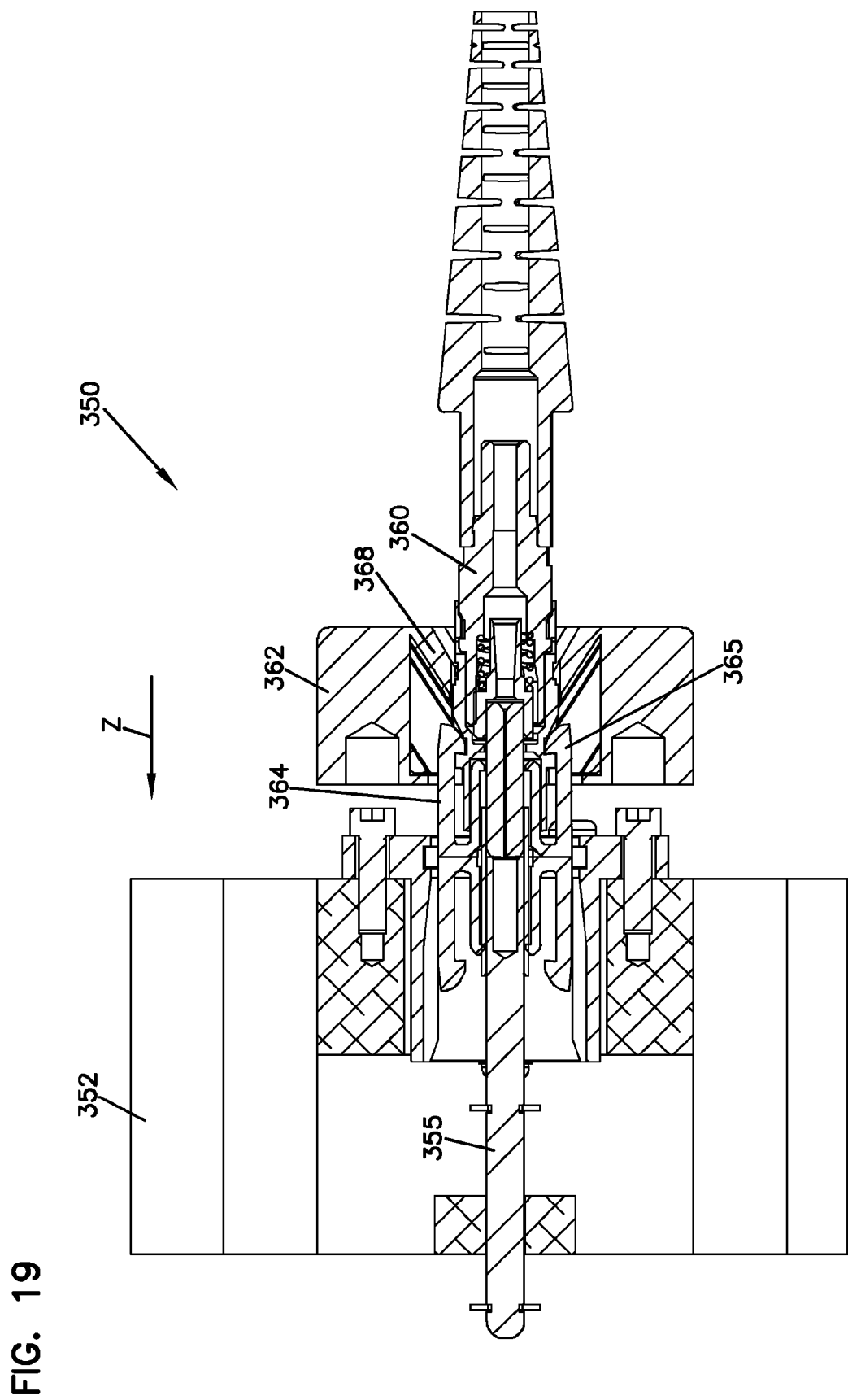
FIG. 19 is a cross sectional view taken along line 19-19 of the adapter assembly of FIG. 17.

Referring now to FIGS. 17-19, another adapter assembly 350 is shown. Adapter assembly 350 is similar to adapter assembly 300, except that adapter assembly 350 includes a support 352 configured to accept SC adapters 354, 356 for SC connectors 358, 360 without outer housings. Also included with adapter assembly 350 are a modified adapter 364, a pin 355, a release ring 362, release plates 368, and spring pins 366 used to connect release ring 362 and release plates 368.

As shown in FIG. 19, connector 360 is received in adapter 364 during testing of connector 360. After testing is complete, release ring 362 including release plates 368 is pushed in a direction Z towards support 352 so that release plates 368 engage and force arms 365 of adapter 364 away from connector 360 so that connector 360 can be removed from adapter 364.

Figure 20:
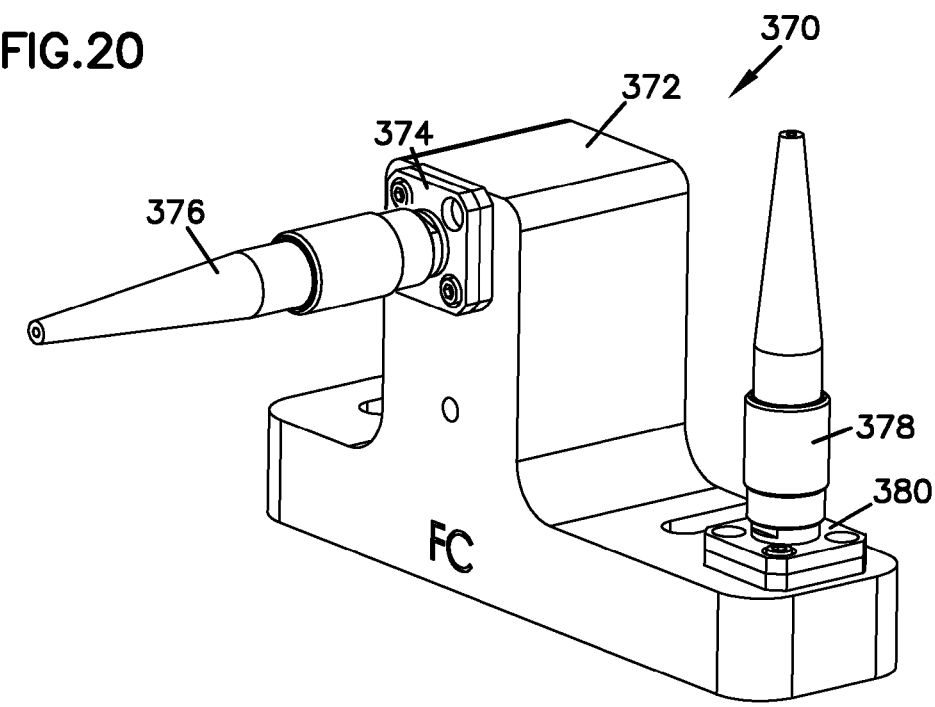
FIG. 20 is a perspective view of another example adapter assembly.

Referring now to FIG. 20, another adapter assembly 370 is shown. Adapter assembly 370 is similar to adapter assemblies 300, 350, except that adapter assembly 370 includes a support 372 configured to accept FC adapters 374, 380 for FC connectors 376, 378.

Figure 21:
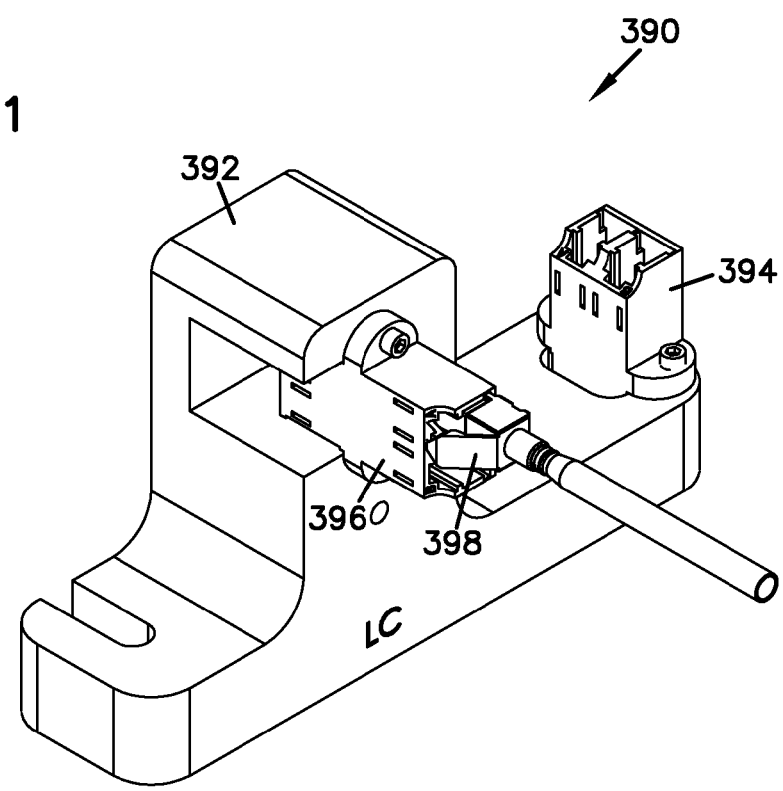
FIG. 21 is a perspective view of another example adapter assembly.

Referring now to FIG. 21, another adapter assembly 390 is shown. Adapter assembly 390 is similar to adapter assemblies 300, 350, 370, except that adapter assembly 390 includes a support 392 configured to accept LC adapter 396 for LC connector 398 and LC adapter 394 for a setup LC connector (not shown).

In the examples shown, adapter assemblies 300, 350, 370, 390 can be coupled to and uncoupled from device 100 to allow device 100 to test the force exerted by the ferrules of different connector types.

Figure 22:
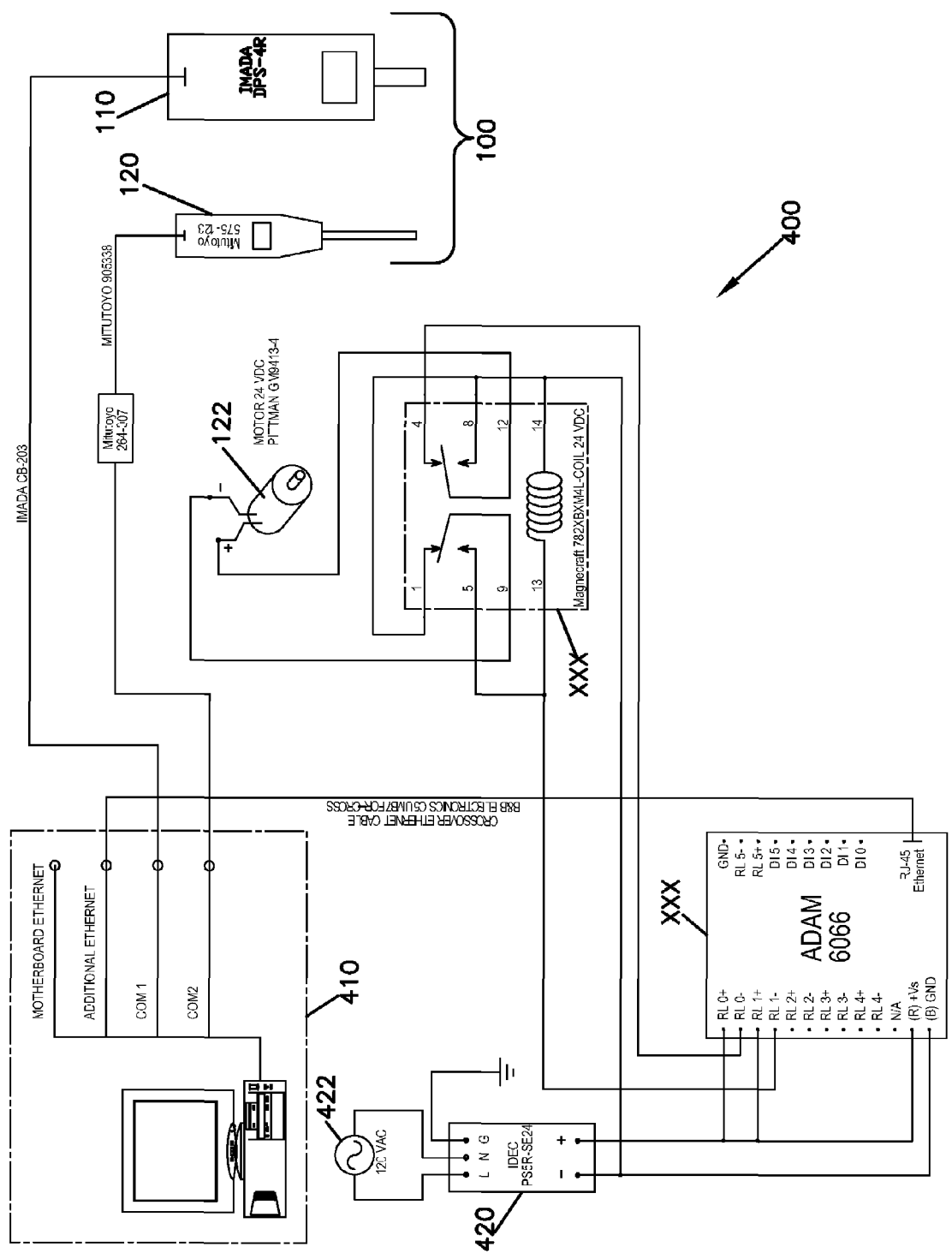
FIG. 22 is a schematic view of an example system including the force gauge device of FIG. 1.

Referring now to FIG. 22, an example system 400 including device 100 with force gauge 110 and digital indicator 120 is shown. System 400 also includes a computer system 410 connected to force gauge 110 and digital indicator 120. System 400 also includes a motor control relay 416, an input/output module 418, and a power supply 420.

Motor control relay 416 is connected to and drives motor 122. In one example, motor control relay 416 is model number 782XBXM4L-COIL 24 VDC manufactured by Magnecraft of Northfield, Ill. Other configurations are possible.

Module 418 is connected to motor control relay 416 and computer system 410. In one example, module 418 is used to facilitate communications between computer system 410 and motor control relay 416. In examples, module 418 is model number ADAM-6066 manufactured by Advantech Co. Ltd. of Cincinnati, Ohio. Other configurations are possible.

Power supply 420 is connected to a source of AC power 422 and to module 418 to provide power thereto. In one example, power supply 420 is model number PS5R-SE24 manufactured by IDEC Corporation of Sunnyvale, Calif. Other configurations are possible.

In the example shown, computer system 410 includes a processing unit, memory such as volatile and non-volatile computer readable media, a removable media drive, input/output devices such as a display, keyboard, and mouse, and one or more communication ports such as Ethernet ports, USB ports, and serial ports.

In use, computer system 410 is connected to and programmed to communicate with force gauge 110, digital indicator 120, and module 418. For example, computer system 410 is programmed to receive and store force data from force gauge 110 and position data from digital indicator 120. Computer system 410 is likewise programmed to correlate the force and position data to provide force information along at a plurality of positions as the ferrule of a connector under test is depressed, as described further below.

Computer system 410 is also programmed to communicate with motor control relay 416 through module 418. For example, computer system 410 can control motor 122 to move force gauge 110 longitudinally in direction X to depress the ferrule of the connector under test. In some embodiments, computer system 410 can control the speed at which motor 122 moves force gauge 110 so that a plurality of force measurements are taken and stored by computer system 410 as the ferrule is depressed.

Figure 23:
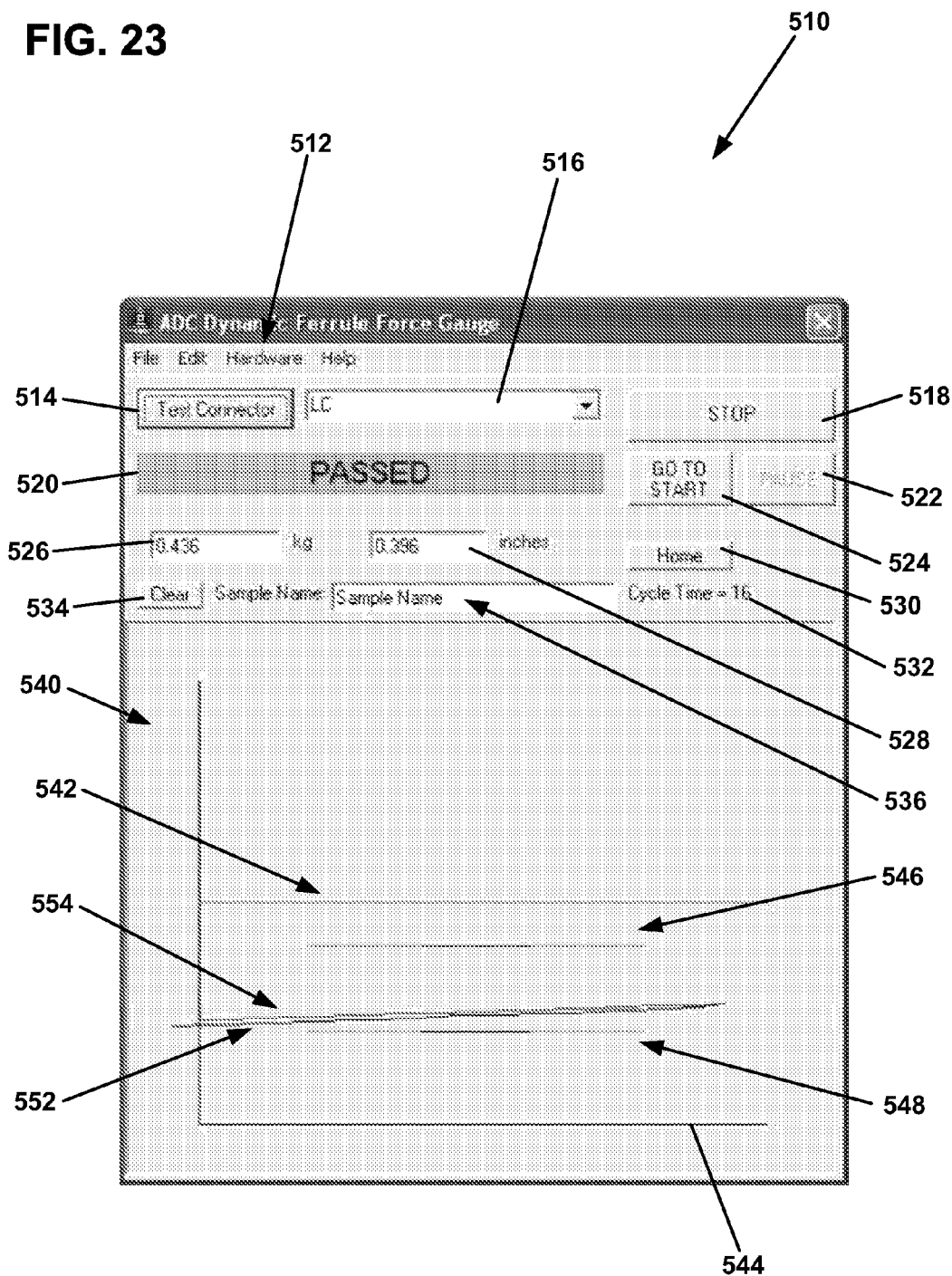
FIG. 23 is an example graphical user interface of an application program executed on a computer system of the system of FIG. 22.
Figure 24:
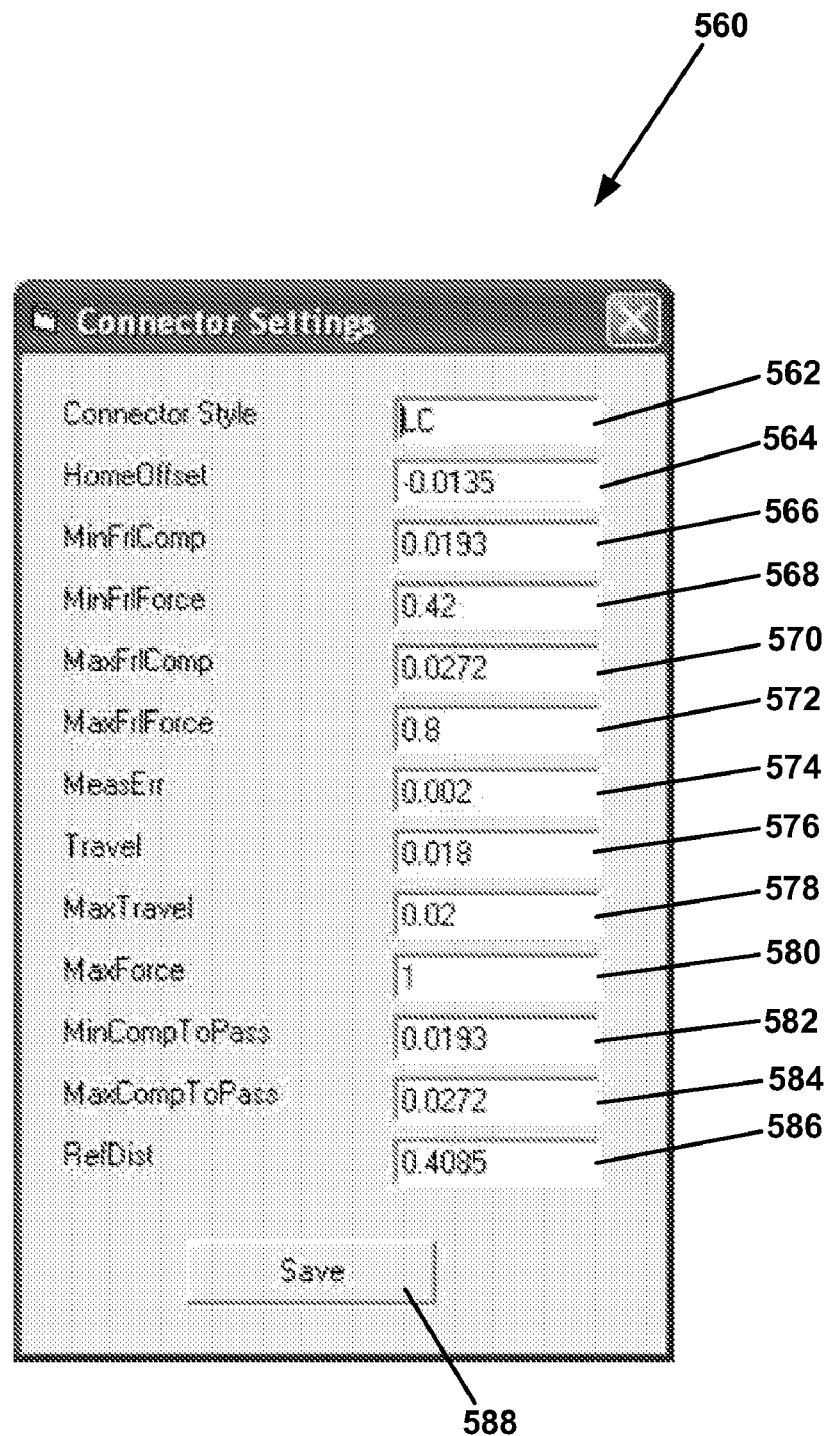
FIG. 24 is another example graphical user interface of an application program executed on a computer system of the system of FIG. 22.
Figure 25:
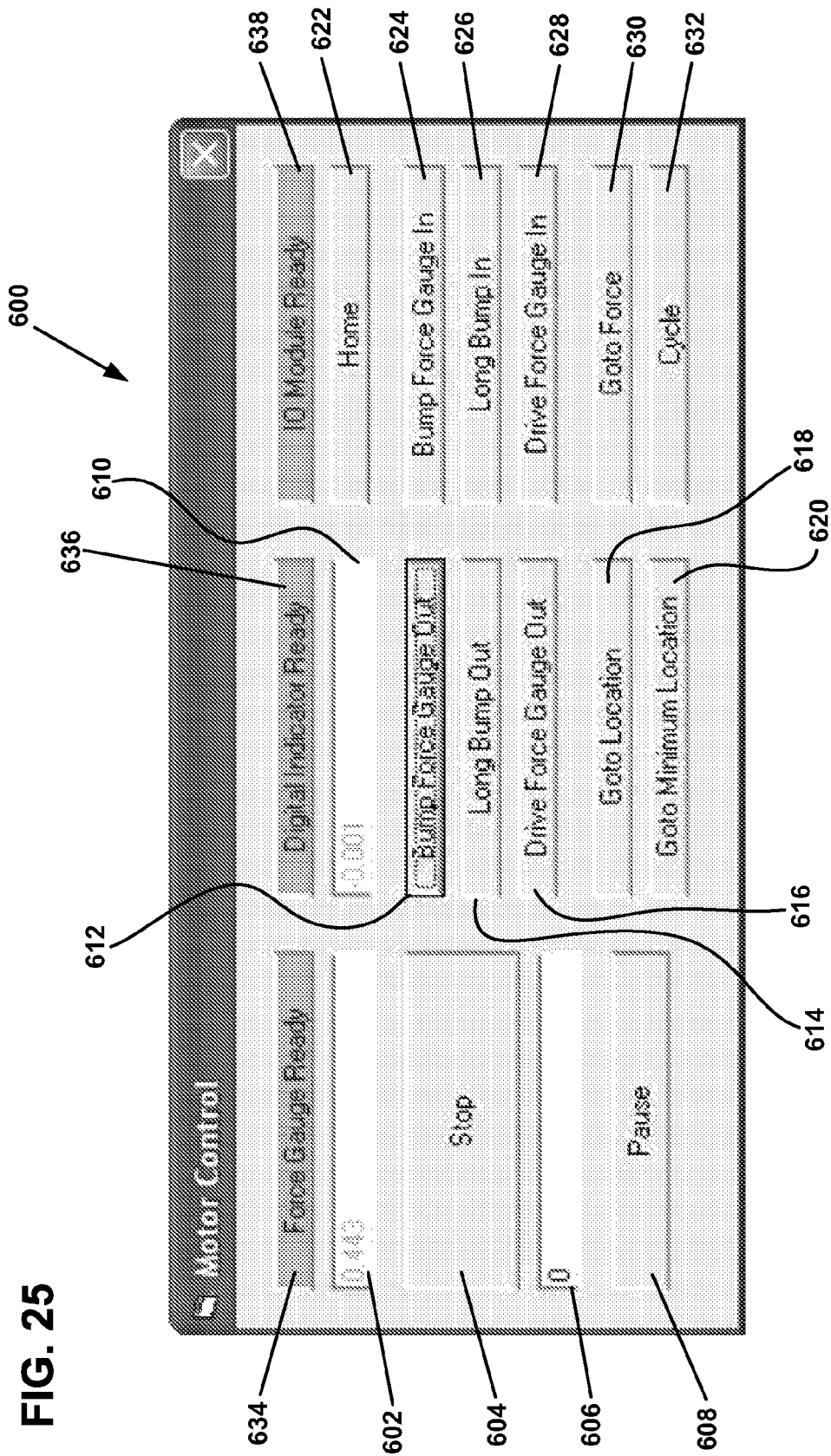
FIG. 25 is another example graphical user interface of an application program executed on a computer system of the system of FIG. 22.

Referring now to FIGS. 23-25, computer system 410 includes one or more application programs installed thereon to assist in the control of device 100, and the storage and presentation of data collected from device 100.

For example, referring to FIG. 23, an example graphical user interface 510 is shown. Interface 510 includes a plurality of controls and input/output fields. For example, user interface 510 includes a menu 512 that allows a user to save data collected by and plots generated by computer system 410, as well as access controls for various components of system 400, such as a control user interface 600 for controlling motor 122, as described below.

Interface 510 also includes a test connector button 514, which, when selected, causes computer system 410 to control motor 122 to move force gauge 110 to depress the ferrule of the connector under test, and to record a plurality of force and position measurements while the ferrule is being depressed.

A connector style selection box 516 allows the user to select the type of connector that is currently being tested. In the example shown, connector system selection box 516 is a drop-down menu that includes a plurality of connector types that can be tested, such as SC with a housing, SC without a housing, FC, LC, and LX.5. The operating parameters used by computer system 410 can be modified based on the type of connector selected in connector style selection box 516. For example, connector settings interface 560, described below, provides a plurality of settings that can be customized based on the connector type.

Interface 510 also includes a stop button 518 that can be selected to terminate a test that is currently in process. A button 522 can be selected to pause the current test. If button 522 is selected during testing, button 522 changes to "resume," which can be selected to resume the testing at the point at which the testing was paused. A go to start button 524 returns the system to an initial testing position if a test has been prematurely stopped using the stop button 518 or the button 522. If no tests are currently being performed, stop button 518, button 522, and go to start button 524 are dimmed and cannot be selected.

An indicator window 520 is used to provide a visual indication of whether or not a connector passes the test. For example, the window 520 can provide the word "PASSED" in a green box to indicate that the connector passed the test (as shown), or provide the word "FAILED" in a red box to indicate that the connector failed the test. The determination of whether or not a connector passes or fails the test can be made using a variety of factors. For example, if the force required to depress the ferrule exceeds a given threshold during testing of the connector, indicator window 520 can indicate that the connector has failed the test.

In example embodiments, the threshold for the maximum force is 1.2 kg. In other embodiments, the threshold for the maximum force is 0.612 kg. Minimum force values such as, for example, 0.8 kg, can be used to provide lower threshold levels for passing or failing the test. In other embodiments, alternative minimum threshold, such as 0.510 kg, can be used.

An end face force display window 526 displays the current value that is being read by force gauge 110 of device 100. Likewise, a distance to reference plane display window 528 displays the current displacement of the force gauge from the home or origin position. A home button 530 guides the user through homing device 100, as described below. A cycle time display indicator 532 displays the number of elapsed seconds during the current test cycle. A sample name text box 536 allows the user to input a name to be associated with the data collected by and plots generated by computer system 410. A clear button 534 can be selected to clear a plot display 540.

Plot display 540 includes a display of an upper control limit 542, a lower control limit 544, and upper and lower threshold limits 546, 548. Plot display 540 also includes a compression plot 554 that illustrates the force required to depress the ferrule of the connector under test over displacement, and an expansion plot 556 that illustrates the force exerted by the ferrule as the ferrule is allowed to return to the forward position. A user can review plot display 540 to determine when, if at all, the force measured for the connector under test exceeded or fell below relevant thresholds by examining if a portion of either of compression plot 554 or expansion plot 556 falls outside threshold limits 546, 548.

Referring now to FIG. 24, an example connector setting interface 560 is shown. Generally, connector setting interface 560 is accessible from interface 510 and can be used to set the operating parameters for the different types of connectors selected in connector style selection box 516. The values of the text boxes of interface 560 can be modified to thereby modify the test conducted during a testing cycle.

For example, a Connector Style text box 562 contains the name of a connector style, such as SC, FC, LC, LX.5, etc. A HomeOffset text box 564 contains the distance between the end face of the connector under test and the tip of force gauge 110 at the start of a cycle in inches (i.e., the home or origin position). If the value is negative, the test will start with the ferrule compressed and the end-face force greater than zero. A negative value will shorten the time required for the test.

A MinFrlComp text box 566 contains the specified minimum amount of ferrule compression in inches, at which the minimum contact force is specified. A MinFrlForce text box 568 contains the specified minimum contact force in kilograms, at which the minimum amount of ferrule compression is specified. A MaxFrlComp text box 570 contains the specified maximum amount of ferrule compression in inches, at which the maximum contact force is specified. A MaxFrl- Force text box 572 contains the specified maximum contact force in kilograms, at which the maximum amount of ferrule compression is specified.

A MeasErr text box 574 contains the distance measurement error in inches. A Travel text box 576 contains the distance in inches traveled by force gauge 110 while compressing the ferrule. This distance must be greater than the HomeOffset+MaxCompToPass. A MaxTravel text box 578 contains the maximum distance in inches that the force gauge may travel. MaxTravel must be greater than Travel. This value determines the horizontal scale of display 540.

A MaxForce text box 580 contains a value above MaxFrlForce and below the maximum force rating of force gauge 110. If this value in text box 580 for MaxFrlForce force is reached, device 100 will stop further compression of the ferrule and fail the connector. A MinCompToPass text box 582 contains a value which defines the left most point of the upper and lower control limits. This value is typically equal to the MinFrlComp. A MaxCompToPass 584 text box contains a value which defines the right most point of the upper and lower control limits. This value is typically equal to the MaxFrlComp. A RefDist text box 586 contains the calibrated value of the distance between a predefined reference point on the housing of the connector style under test representing the "mechanical reference plane," and the end of the ferrule that represents the "optical reference plane." A Save button 588 can be selected to save the settings provided in interface 560.

Referring now to FIG. 25, an example motor control interface 600 is shown. Motor control interface 600 is accessible from interface 510. Motor control interface 600 provides controls for manipulating the control of motor 122.

A force display window 602 shows the current force value as measured by force gauge 110. A stop button 604 stops motor 122 from turning when selected. A target text box 606 contains the target value used by a Goto Location button 618, a Goto Minimum Location button 620, and a Goto Force button 630, as described below. A Pause button 608 stops motor 122 from turning in the currently running routine when selected.

A location Display window 610 shows the current distance value measured by digital indicator 120. A Bump Force Gauge Out button 612 causes motor 122 to move force gauge 110 away from the connector under test a small amount when selected, such as about 0.0005 inches. A Long Bump Out button 614 causes motor 122 to move force gauge 110 away from the connector a large amount when selected, such as about 0.0065 inches. A Drive Force Gauge Out button 616 drives force gauge 110 away from the connector when selected.

The Goto Location button 618 drives force gauge 110 until digital indicator 120 reads the value specified in target text box 606 plus or minus 0.0005 inches. The Goto Minimum Location Button 620 activates motor 122 to move force gauge 110 until digital indicator 120 reads the value specified target text box 606, and then shuts off motor 122.

A Home button 622 homes the system, as described further below. A Bump Force Gauge In button 624 causes motor 122 to move force gauge 110 towards the connector a small amount when selected, such as about 0.0005 inches. A Long Bump In button 626 causes motor 122 to move force gauge 110 towards the connector a large amount, such as about 0.0065 inches. A Drive Force Gauge In button 628 drives force gauge 110 towards the connector.

A Goto Force Button 630 drives force gauge 110 until force gauge 110 reads the value specified in target text box 606 when selected. A Cycle button 632 moves force gauge 110 through a test cycle according to the specifications of the current connector style when selected.

A Force Gauge Status button 634 is green with the text "Force Gauge Ready" when force gauge 110 is functioning correctly, and is red with the text "Force Gauge Not Ready" when force gauge 110 is in a fault condition. Clicking on Force Gauge Status button 634 will open a force gauge user interface window that allows for trouble shooting of force gauge 110.

A Digital Indicator Status button 636 is green with the text "Digital Indicator Ready" when digital indicator 120 is functioning correctly, and is red with the text "Digital Indicator Not Ready" when digital indicator 120 is in a fault condition. Clicking on Digital Indicator Status button 636 will open a digital indicator user interface that allows for trouble shooting of digital indicator 120. An IO Module Status button 638 is green with the text "IO Module Ready" when module 418 is functioning correctly, and is red with the text "IO Module Not Ready" when module 418 is in a fault condition. Clicking on IO Module Status button 638 will open an IO user interface that allows for the trouble shooting of module 418.

User interfaces 510, 560, 600 are examples only, and computer system 410 can be programmed to include more or fewer interfaces with different information. For example, computer system 410 can include interfaces for controlling and/or troubleshooting force gauge 110, digital indicator 120 and module 418.

Figure 26:
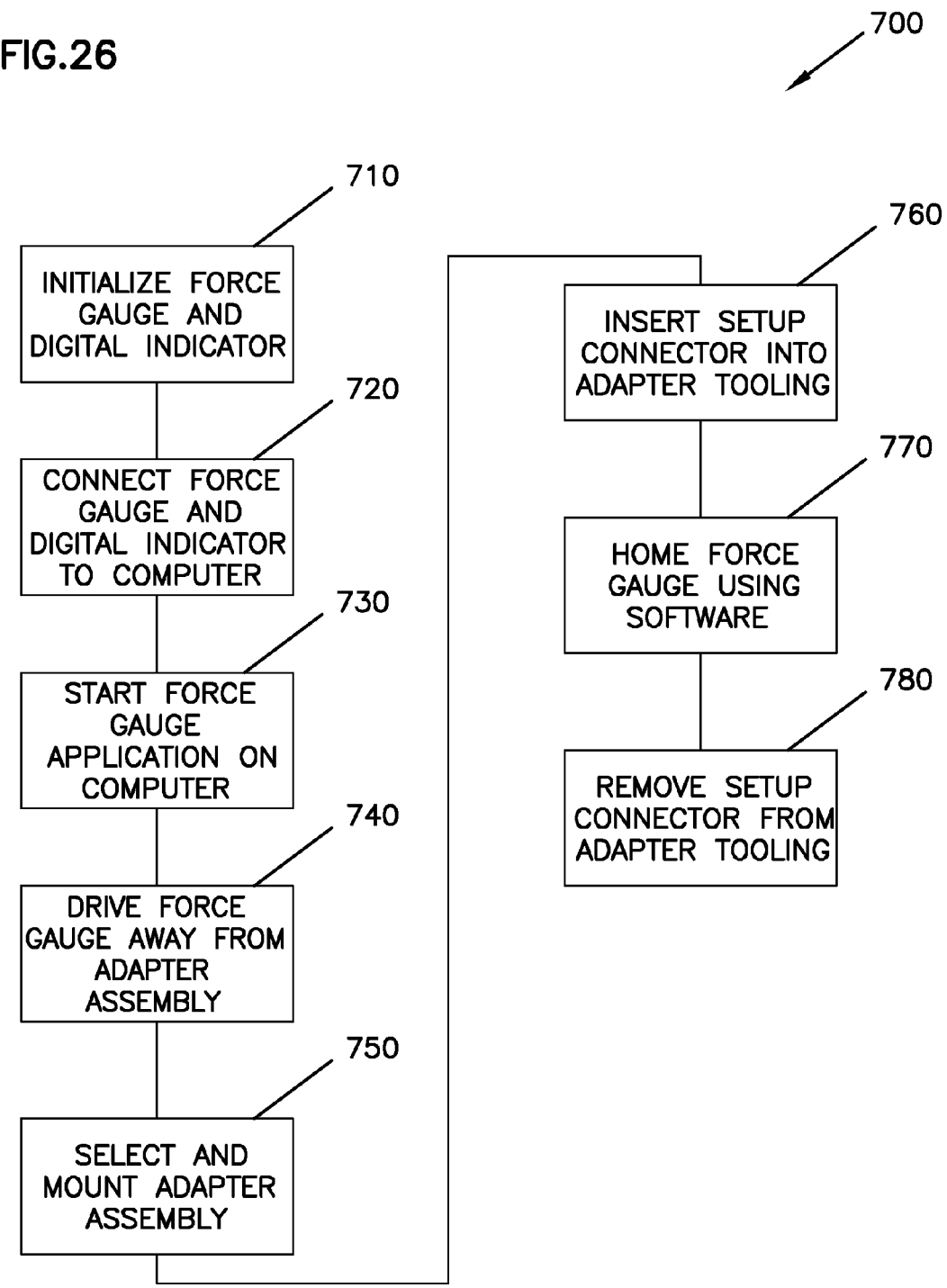
FIG. 26 is an example flowchart for calibrating the system of FIG. 22.

Referring now to FIG. 26, an example method 700 for calibrating device 100 of system 400 is shown. At operation 710, force gauge 110 and digital indicator 120 are initialized. To initialize force gauge 110 and digital indicator 120, device 100 is placed on a level surface and is turned on. In addition, force gauge 110 can be set to a specified unit (e.g., kilograms), and can be zeroed. Digital indicator 120 can be turned on and cleared as well.

Next, at operation 720, force gauge 110 and digital indicator 120 are connected to computer system 410 using a connection such as serial or USB. At operation 730, the force gauge interface (e.g., interface 510) is executed on computer system 410. Next, at operation 740, force gauge 110 is controlled to move force gauge 110 away from the adapter assembly (e.g., one of adapter assemblies 300, 350, 370, 390). Next, at operation 750, the desired adapter assembly is selected based on the connector type to be tested, and the adapter assembly is mounted to device 100 by loosening nuts 166, sliding slots 308, 310 of the adapter assembly onto screws 162, and tightening nuts 166 to hold the adapter assembly in place on device 100. Control is then passed to operation 760, at which the setup connector (e.g., setup SC connector 342) is placed in the adapter assembly.

Next, at operation 770, home button 530 is selected from interface 510, and force gauge 110 is set to the home position using a homing process. In example, the homing process is accomplished by controlling motor 122 to move force gauge 110 longitudinally towards the connector until force gauge 110 contacts the connector. At this point, force gauge 110 can be backed a known distance away from the connector (e.g., the value in HomeOffset text box 564 of FIG. 24) to the designated home position.

Finally, at operation 780, the setup connector is removed. Device 100 is then ready to test one or more connectors. If a new connector type is to be tested, operations 750, 760, 770, and 780 can be repeated to prepare device 100 for the new connector type.

Figure 27:
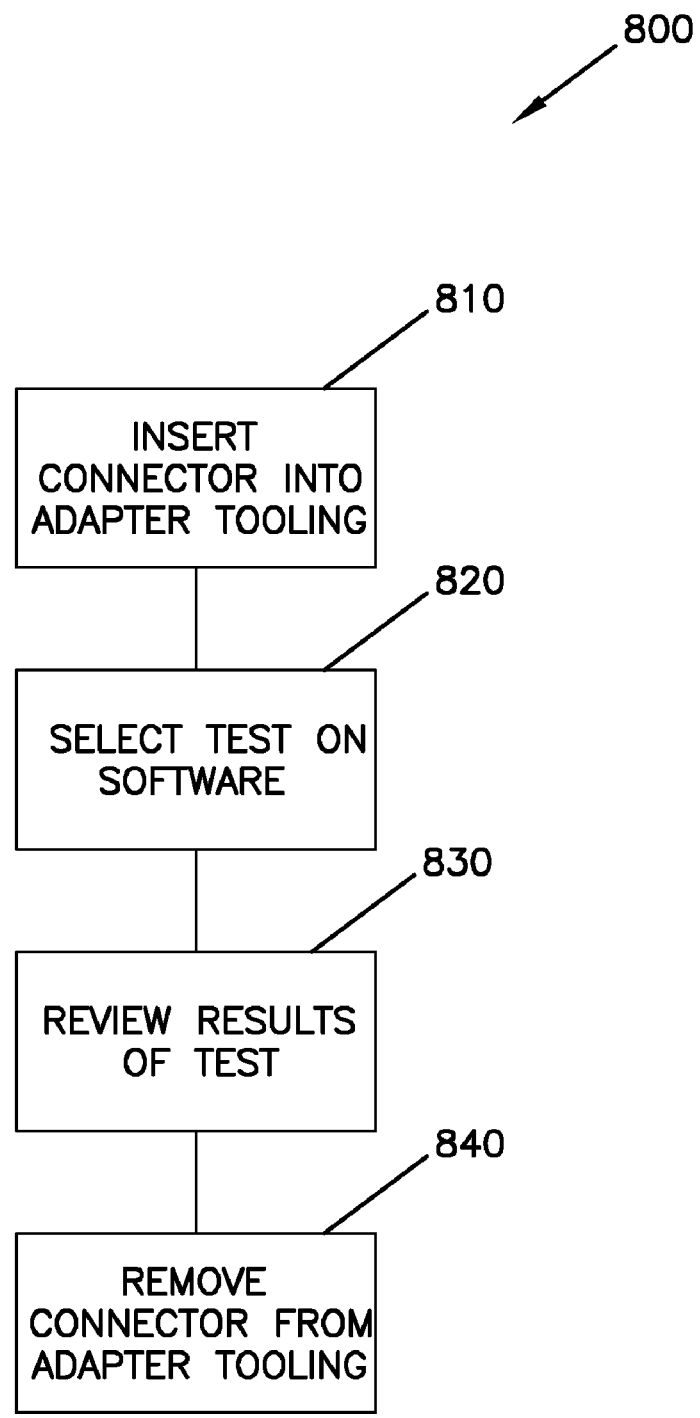
FIG. 27 is an example flowchart for testing a fiber connector using the system of FIG. 22.
Figure 28:
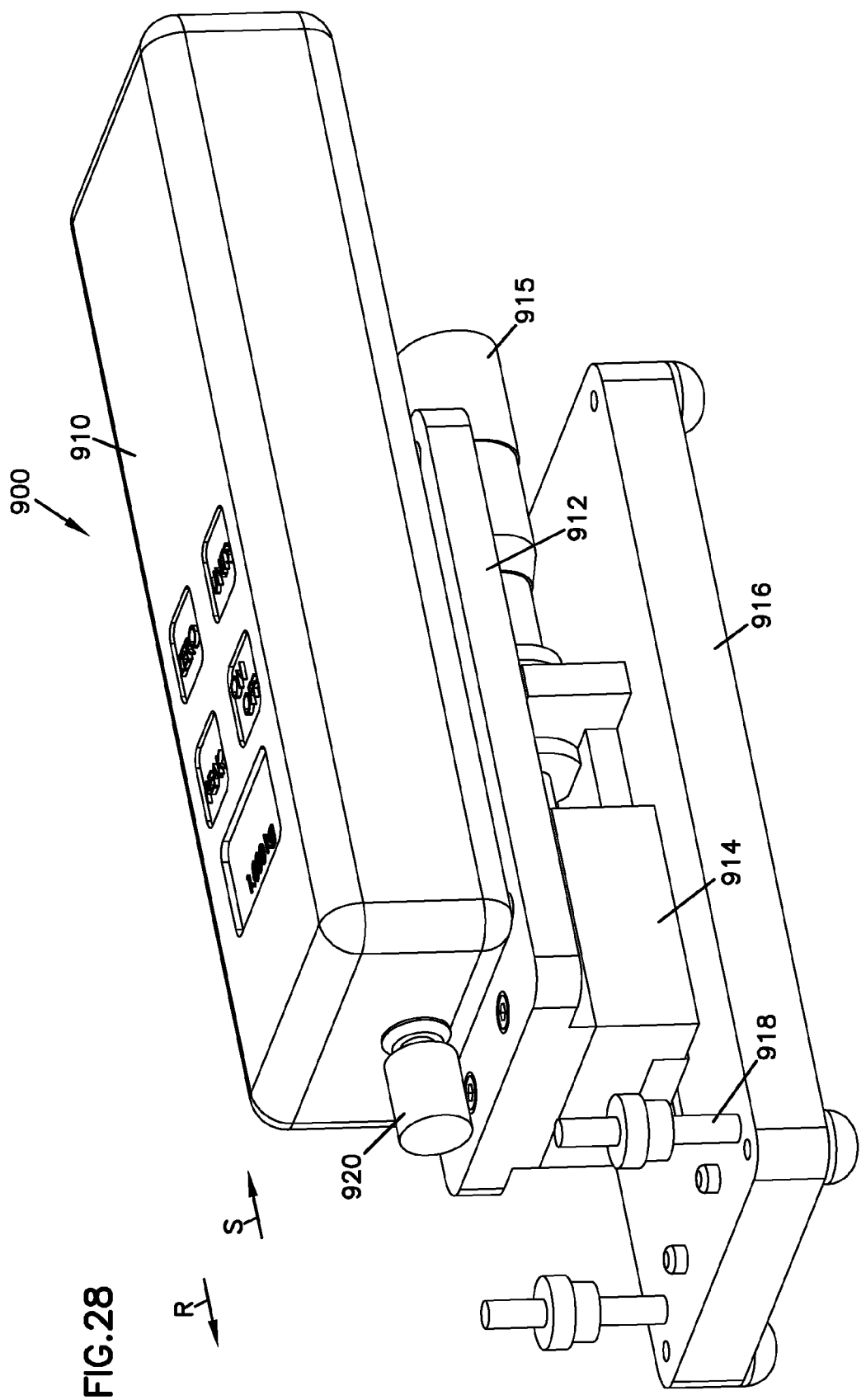
FIG. 28 is a perspective view of another example force gauge device.
Figure 29:
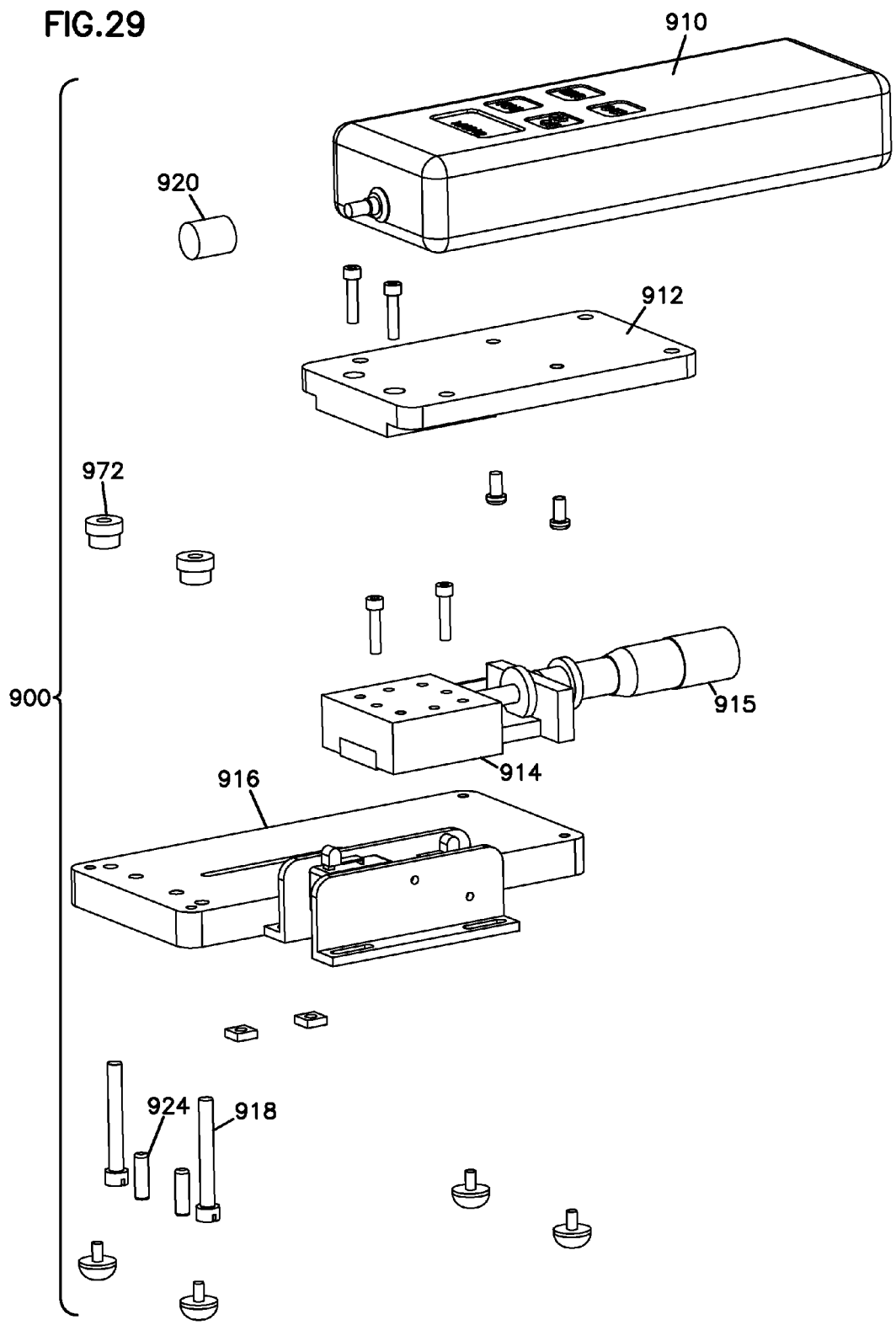
FIG. 29 is an exploded perspective view of the force gauge device of FIG. 28.
Figure 30:
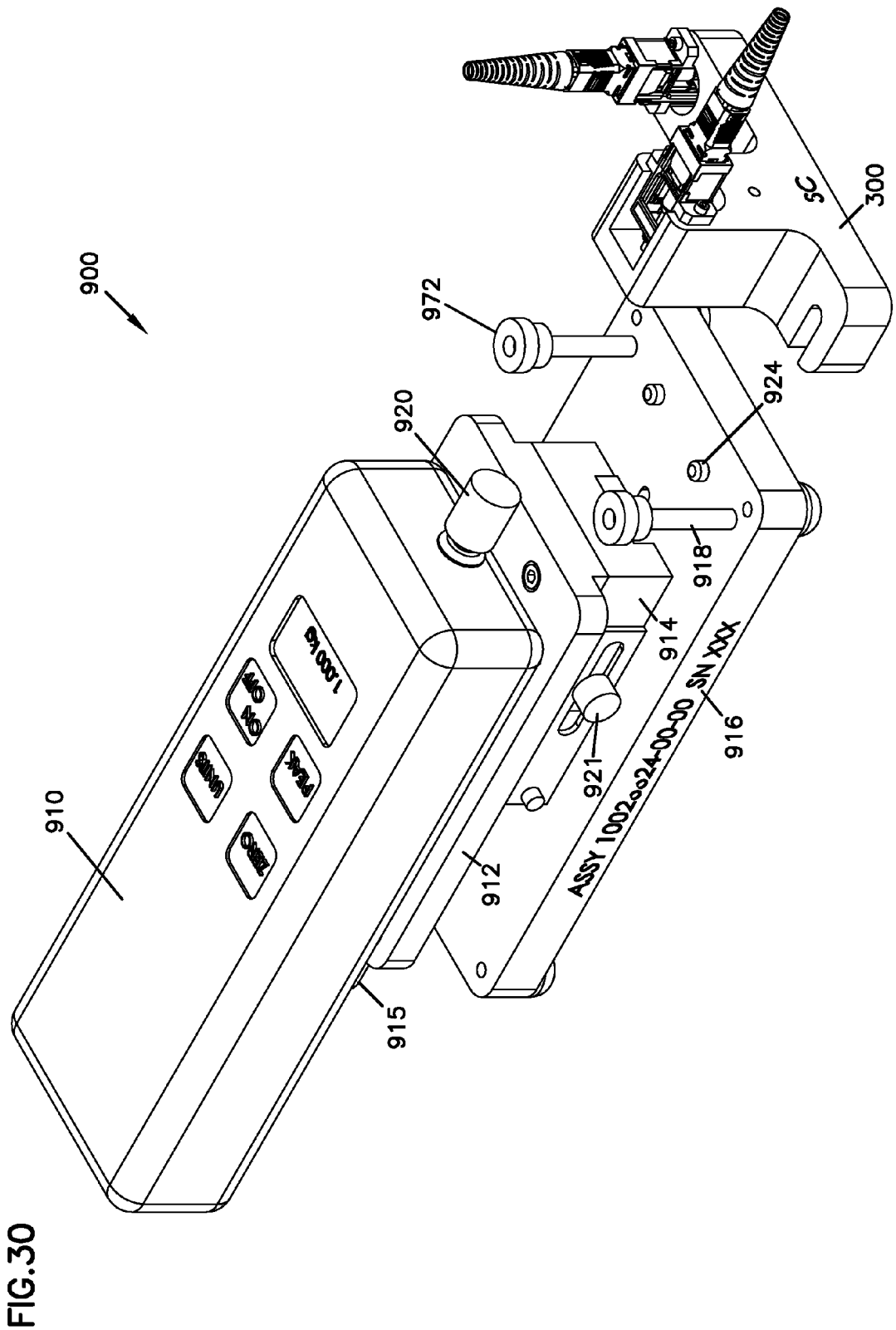
FIG. 30 is another perspective view of the force gauge device of FIG. 28 including an example adapter assembly shown exploded therefrom.

Referring now to FIG. 27, an example method 800 for testing a connector is shown. At operation 810, the connector under test is placed in the adapter of the adapter assembly.

Next, at operation 820, connector button 514 on interface 510 is selected to start the testing. After testing is complete, control is passed to operation 830, and the results of the test can be reviewed on, for example, interface 510. Next, at operation 840, the connector under test is removed from the adapter assembly. Method 800 can be repeated if additional connectors are to be tested.

Referring now to FIGS. 28-33, another example of a force gauge device 900 is shown. Device 900 is similar to device 100, in that device 900 is used to measure the force necessary to depress the ferrule of a fiber connector. However, device 900 is manual, in that device 900 takes a single measurement of the force necessary to depress the ferrule, rather than a plurality of measurements at different points during displacement of the ferrule.

Device 900 includes a force gauge 910. An end cap assembly 920 is connected to force gauge 910. In examples, force gauge 910 is model number DPS-4R that is manufactured by Imada of Northbrook, Ill. In alternative examples, force gauge 910 is model WAGNER FORCE ONE manufactured by Wagner Instruments of Greenwich, Conn. Other configurations are possible.

Force gauge 910 is connected to gauge mount plate 912, which is, in turn, connected to stage 914 including adjustment knob 915. Stage 914 is coupled to base plate 916. Screws 918 and dowels 924 extend through base plate 916 and include thumb nuts 922 that can be threaded onto screws 918 to align and mount an adapter assembly, such as adapter assembly 300, to device 900.

Force gauge 910 can be positioned a desired distance from the adapter assembly by turning adjustment knob 915 of stage 914 clockwise or counterclockwise by hand to move force gauge 910 in directions R and S relative to base plate 916. Once in the desired position, stage 914 can be locked into position by tightening a lock 921. See FIG. 30.

Figure 31:
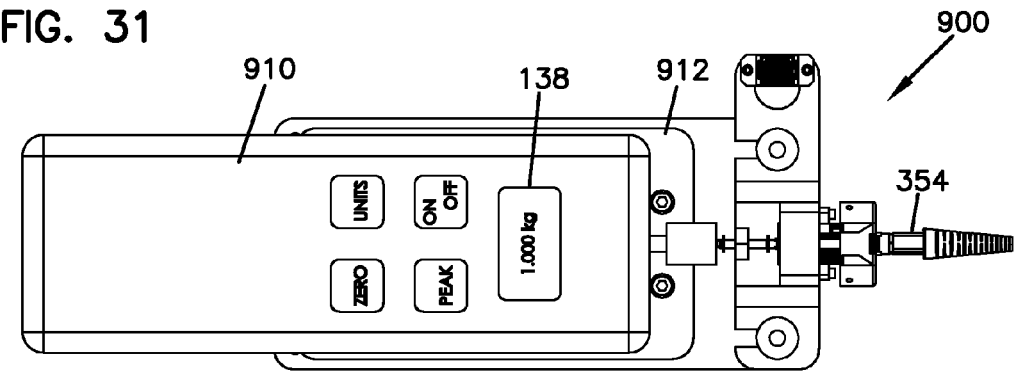
FIG. 31 is a top view of the force gauge device of FIG. 30.
Figure 32:
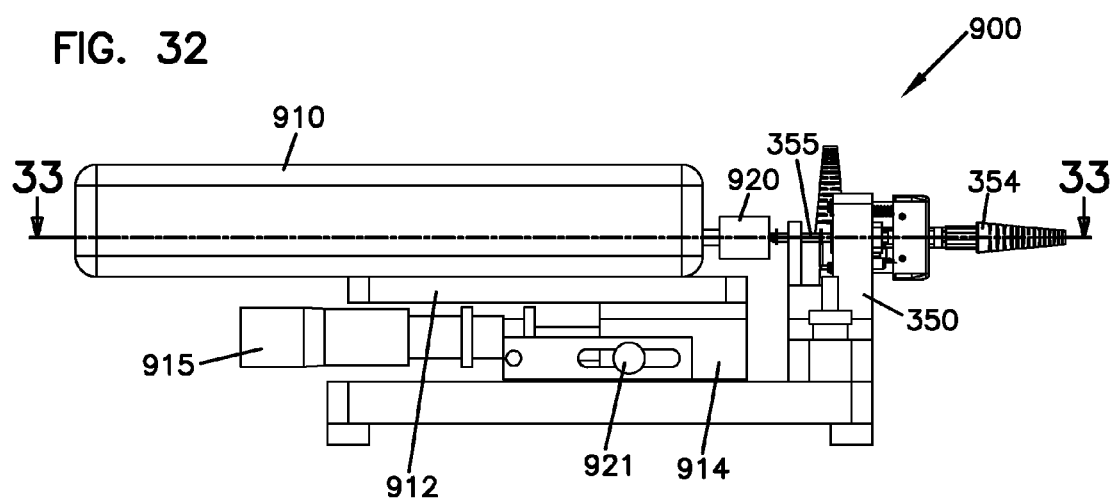
FIG. 32 is a side view of the force gauge device of FIG. 31.
Figure 33:
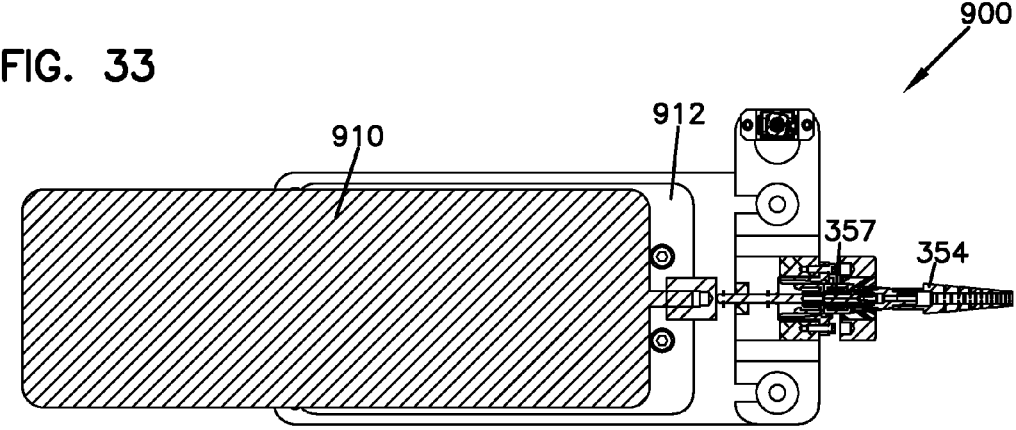
FIG. 33 is a cross sectional view taken along line 33-33 of the force gauge device of FIG. 32.

Referring to FIG. 31-33, adapter assembly 350 including connector 354 is shown coupled to device 900. Pin 355 of adapter assembly 350 contacts and depresses ferrule 357 of connector 354. The opposite end of pin 355 contacts end cap assembly 920 of force gauge 910. The force exerted to displace ferrule 357 is shown on display 138 of force gauge 910.

Referring now to FIG. 34, an example method 950 for calibrating device 900 is shown. At operation 952, force gauge 910 is initialized. To initialize force gauge 910, force gauge 910 is placed on a level surface and is turned on. In addition, force gauge 910 can be set to a specified unit (e.g., kilograms), and can be zeroed.

Next, at operation 954, the desired adapter assembly (e.g., one of adapter assemblies 300, 350, 370, 390) is selected based on the connector type, and the adapter assembly is mounted to device 900 by loosening nuts 922, sliding slots 308, 310 of the adapter assembly onto screws 918, and tightening nuts 922 to hold the adapter assembly in place on device 900.

Control is then passed to operation 956, at which the setup connector (e.g., setup SC connector 342) is placed in the adapter assembly. Next, at operation 958, adjustment knob 915 of stage 914 is rotated to move stage 914 and attached force gauge 910 longitudinally in direction R towards the setup connector until the force shown on force gauge 910 is at a desired value (e.g., 1.2 kg). Next, at operation 960, lock 921 is tightened. Finally, at operation 962, the setup connector is removed. Device 900 is then ready to test one or more connectors. If a new connector type is to be tested, operations 954, 956, 958, 960, 962 can be repeated to prepare device 900 for the new connector type.

Referring now to FIG. 35, an example method 970 for testing a connector is shown. At operation 972, the connector under test is placed in the adapter of the adapter assembly. Next, at operation 974, force gauge 910 is examined to review the results of the test. Next, at operation 976, the connector under test is removed from the adapter assembly. Method 970 can be repeated if additional connectors are to be tested.

Devices 100 and 900 can be used to measure the force needed to depress a ferrule of a fiber connector. Such measurements can be used, for example, to identify connectors that are functioning with a displacement force at a non-optimal level. For example, devices 100 and 900 can be used to identify fiber connectors that require excessive force during compression or expansion of the ferrule, or that require less than minimal force during compression or expansion the ferrule. In this manner, devices 100 and 900 can be used to identify fiber connectors that exhibit less than optimal optical performance.

Some of the examples described herein, such as system 400, are further advantageous in that compression and expansion forces can be measured at a plurality of displacements as the ferrule is depressed and released. In this manner, a comprehensive understanding of the performance of the connector can be obtained. In other examples, such as device 900, the devices are portable so that technicians can utilize the devices in the field to test and identify those connectors exhibiting less than optimal performance due to sub-optimal ferrule compression/expansion forces.

The various embodiments described above are provided by way of illustration only and should not be construed to limiting. Those skilled in the art will readily recognize various modifications and changes that may be made to the embodiments described above without departing from the true spirit and scope of the disclosure or the following claims.

What is claimed is:

1. A device for measuring a force exerted by a ferrule of a fiber optic connector, the device comprising:
    a base including an adapter mount configured to accept one of a plurality of adapter assemblies;
    a stage coupled to the base, the stage moving longitudinally with respect to the base;
    a force gauge coupled to the stage;
    an adapter assembly configured to be coupled to the adapter mount of the base, the adapter assembly defining an adapter configured to receive the fiber optic connector, wherein the adapter assembly is a first adapter assembly configured to accept an FC connector, and further comprising a second adapter assembly configured to accept an SC connector, and a third adapter assembly configured to accept an LC connector, wherein the first, second, and third adapter assemblies are configured to be interchangeably coupled to the adapter mount of the base; and
    a pin extending from the adapter assembly to the force gauge, the pin including an end, wherein the end defines a cavity such that the end contacts the ferrule, and the cavity is positioned such that the end does not contact an optical fiber within the ferrule;
    wherein the fiber optic connector is connected to the adapter assembly, and the force gauge measures the force exerted by the ferrule of the fiber optic connector.

2. The device of claim 1, wherein each of the first, second, and third adapter assemblies can be coupled to and uncoupled from the adapter mount of the base by tightening and loosening nuts accepted into slots defined by the base.

3. The device of claim 1, further comprising a motor to move the force gauge longitudinally with respect to the fiber optic connector.

4. The device of claim 3, further comprising an indicator configured to measure a position of the force gauge relative to the fiber optic connector.

5. The device of claim 1, wherein the device is configured to measure the force exerted by the ferrule of the fiber optic connector at a plurality of positions as the ferrule of the fiber optic connector is depressed.

6. A system for measuring a force exerted by a ferrule of a fiber optic connector, the system comprising:
- a device for measuring the force exerted by the ferrule, the device including a base including an adapter assembly for receiving the fiber optic connector, a stage coupled to the base, the stage moving longitudinally with respect to the base, and a force gauge coupled to the stage;
- a motor positioned to move the stage longitudinally with respect to the base;
- a computer system connected to the force gauge of the device and to the motor; and
- a digital indicator configured to measure a position of the force gauge relative to the fiber optic connector;
- wherein the computer system is programmed to control the motor to move the force gauge longitudinally with respect to the base;
- wherein the force gauge measures the force exerted by the ferrule of the fiber optic connector as the force gauge is moved longitudinally by the motor;
- wherein the computer system is programmed to receive and store a plurality of forces measured by the force gauge as the force gauge is moved longitudinally by the motor to compress the ferrule of the fiber optic connector; and
- wherein the computer system is connected to the digital indicator such that the computer system is programmed to store each of a plurality of distances measured by the digital indicator as the force gauge is moved longitudinally by the motor to measure each of the plurality of forces.

7. The system of claim 6, further comprising a graphical user interface that is executable on the computer system, wherein the graphical user interface includes a plurality of controls programmed to control the motor.

8. The system of claim 7, wherein the graphical user interface further comprises a plot generated by the computer system to visually indicate the plurality of forces measured by the force gauge as the force gauge is moved longitudinally by the motor.

9. The system of claim 8, wherein the plot further comprises upper and lower thresholds to visually indicate if the plurality of forces fall outside of the upper or lower thresholds.

10. The system of claim 6, further comprising a motor control relay connected between the computer system and the motor, wherein the computer system is programmed to communicate with the motor control relay, and the motor control relay is programmed to control the motor.

11. A method for measuring a force exerted by a ferrule of a fiber optic connector, the method comprising:
- selecting an adapter assembly among a plurality of adapter assemblies configured to accept a plurality of different connector types;
- coupling the adapter assembly to a device including a force gauge;
- calibrating the force gauge prior to measuring the force;
- measuring the force exerted by the ferrule of the fiber optic connector using the force gauge;
- storing a plurality of force measurements as the ferrule is depressed and released;
- measuring a relative distance between the force gauge and the fiber optic connector as each of the plurality of force measurements are taken; and
- plotting a diagram of the distance and the force for each of the distance and the plurality of force measurements.

12. The method of claim 11, further comprising determining a performance characteristic of the fiber optic connector based on the force.

13. The method of claim 12, wherein determining the performance characteristic further comprises:
- comparing the force to a threshold; and
- determining if the fiber optic connector passes or fails based on the comparison.

14. The method of claim 11, further comprising homing the force gauge.

* * * * *